United States Patent
Shichino

(10) Patent No.: US 12,142,943 B2
(45) Date of Patent: Nov. 12, 2024

(54) POWER RECEPTION APPARATUS, CONTROL METHOD, AND COMPUTER-READABLE STORAGE MEDIUM

(71) Applicant: CANON KABUSHIKI KAISHA, Tokyo (JP)

(72) Inventor: Takahiro Shichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 18/049,996

(22) Filed: Oct. 26, 2022

(65) Prior Publication Data

US 2023/0063867 A1    Mar. 2, 2023

Related U.S. Application Data

(63) Continuation of application No. PCT/JP2021/014482, filed on Apr. 5, 2021.

(30) Foreign Application Priority Data

Apr. 30, 2020 (JP) .................................. 2020-080694

(51) Int. Cl.
*H02J 50/60* (2016.01)
*H02J 50/12* (2016.01)
*H02J 50/80* (2016.01)

(52) U.S. Cl.
CPC .............. *H02J 50/60* (2016.02); *H02J 50/12* (2016.02); *H02J 50/80* (2016.02)

(58) Field of Classification Search
CPC .............. H02J 50/60; H02J 50/12; H02J 50/80
See application file for complete search history.

(56) References Cited

U.S. PATENT DOCUMENTS

| | | | | |
|---|---|---|---|---|
| 2015/0022015 A1* | 1/2015 | Kim | ..................... | H02J 50/12 307/104 |
| 2015/0278038 A1* | 10/2015 | Halker | ..................... | G06F 11/20 714/3 |
| 2015/0349542 A1* | 12/2015 | Yamamoto | ..................... | H02J 50/12 307/104 |

(Continued)

FOREIGN PATENT DOCUMENTS

| | | |
|---|---|---|
| JP | 2009033782 A | 2/2009 |
| JP | 2013132133 A | 7/2013 |
| JP | 2014007838 A | 1/2014 |

(Continued)

*Primary Examiner* — Lincoln D Donovan
*Assistant Examiner* — Alex W Lam
(74) *Attorney, Agent, or Firm* — Canon U.S.A., Inc. IP Division

(57) ABSTRACT

A power reception apparatus wirelessly receives power from a power transmission apparatus, measures a value corresponding to received power in a first period in which the power transmission apparatus limits power transmission, measures, in a second period, a value corresponding to received power used to detect an object different from the power transmission apparatus and the power reception apparatus based on a relationship between a value corresponding to transmitted power in the power transmission apparatus and a value corresponding to the received power in the power reception apparatus, controls a timing of the second period such that the first period and the second period do not overlap.

7 Claims, 13 Drawing Sheets

(56) References Cited

U.S. PATENT DOCUMENTS

2016/0085281 A1* 3/2016 Tanabe .................... H04W 4/80
　　　　　　　　　　　　　　　　　　　713/310

FOREIGN PATENT DOCUMENTS

| JP | 2014187795 A | 10/2014 |
| JP | 2015027172 A | 2/2015 |
| JP | 2016007117 A | 1/2016 |
| JP | 2017034972 A | 2/2017 |
| JP | 2017070074 A | 4/2017 |
| JP | 2018512036 A | 4/2018 |
| WO | 2016/159788 A1 | 10/2016 |

* cited by examiner

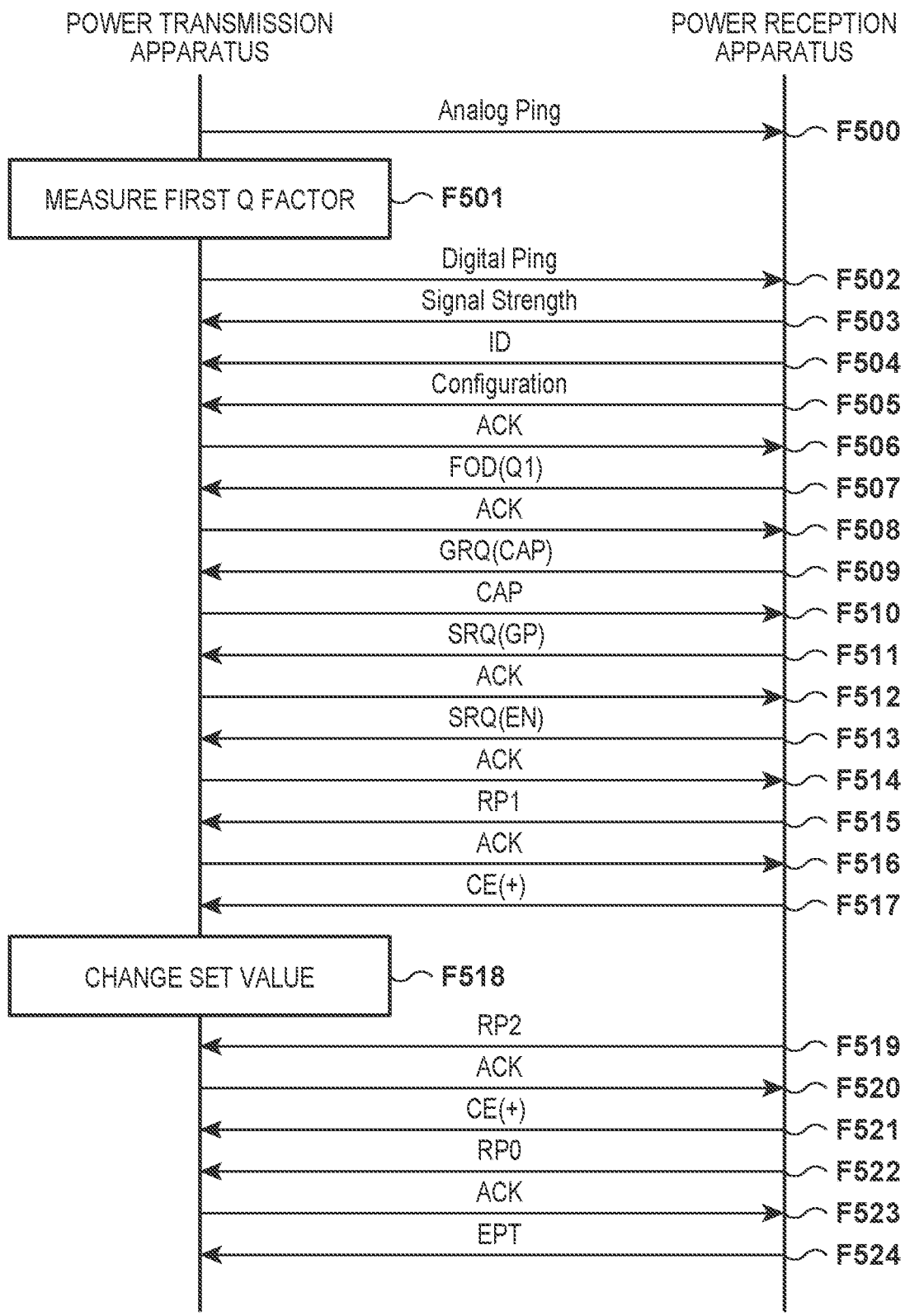

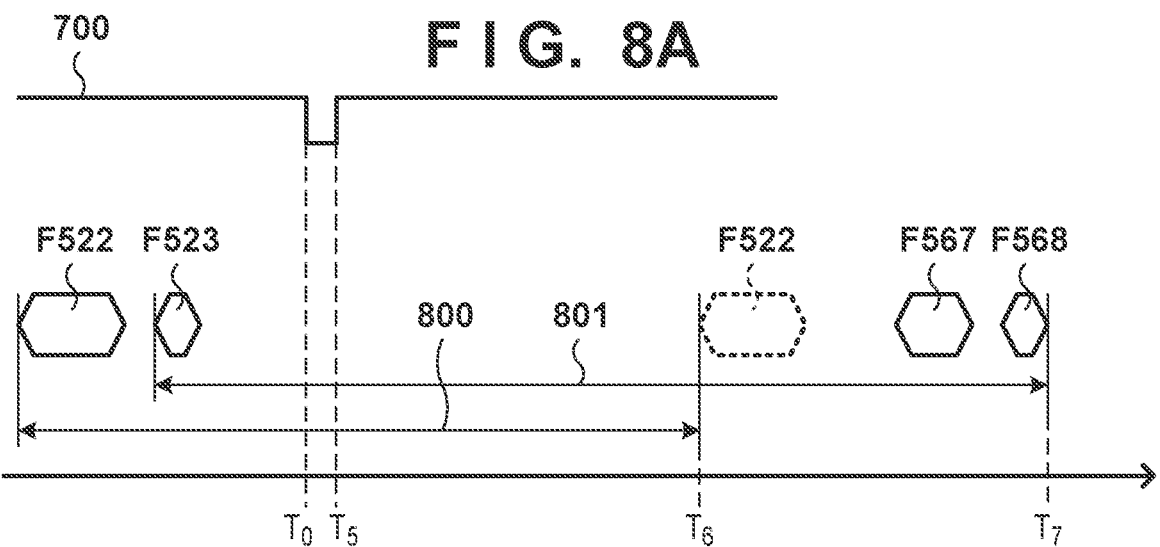
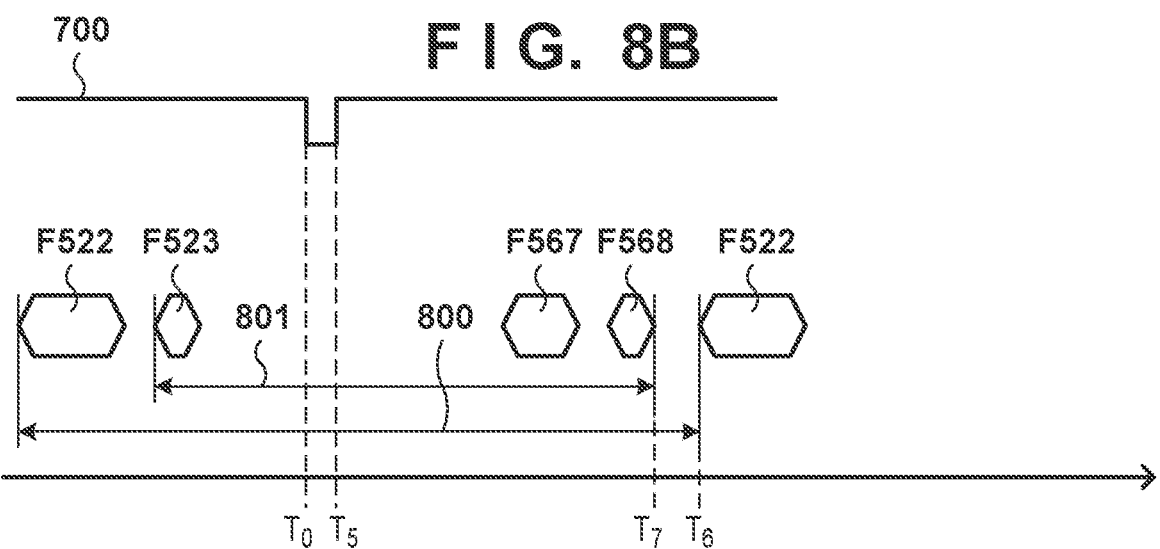

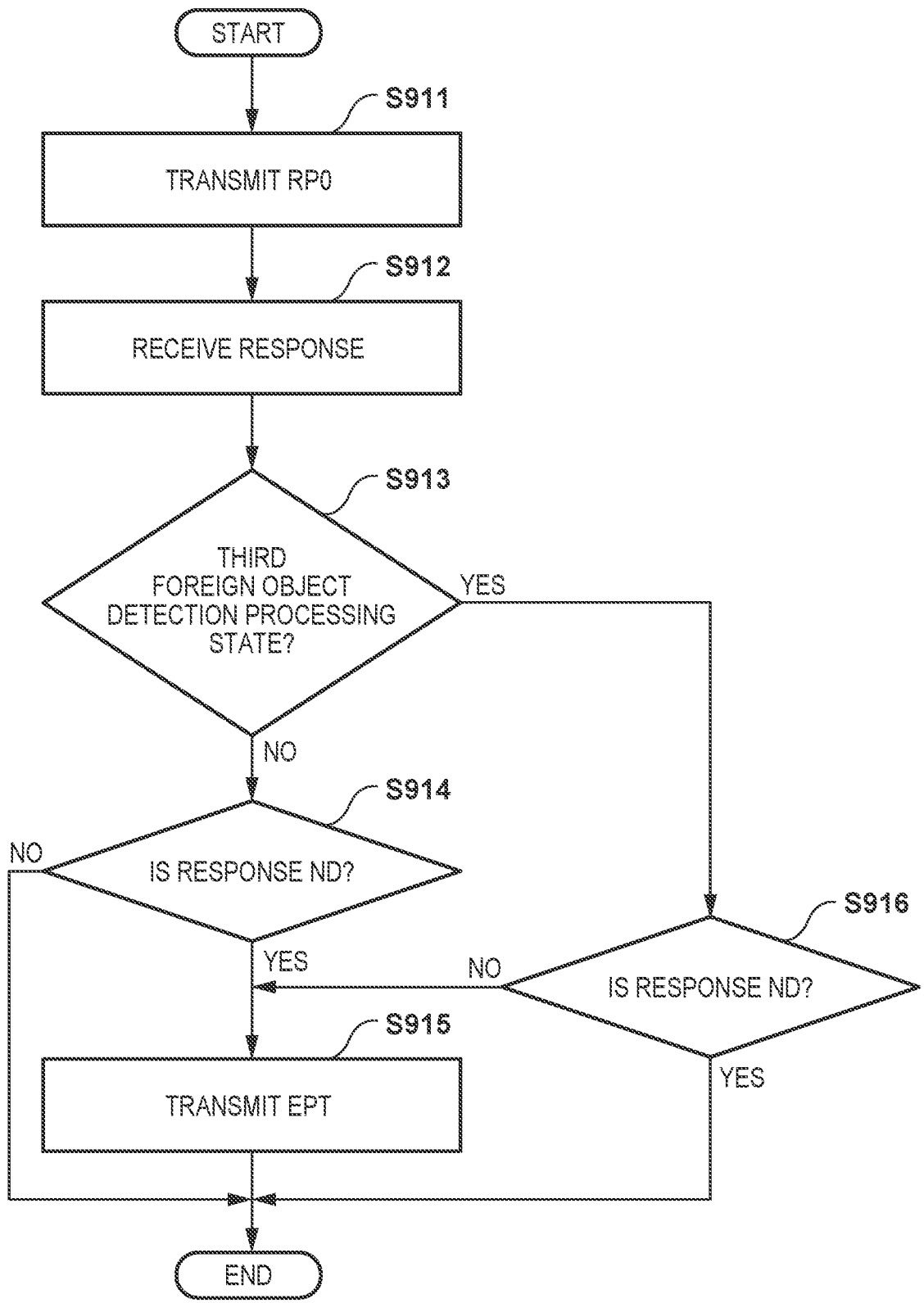

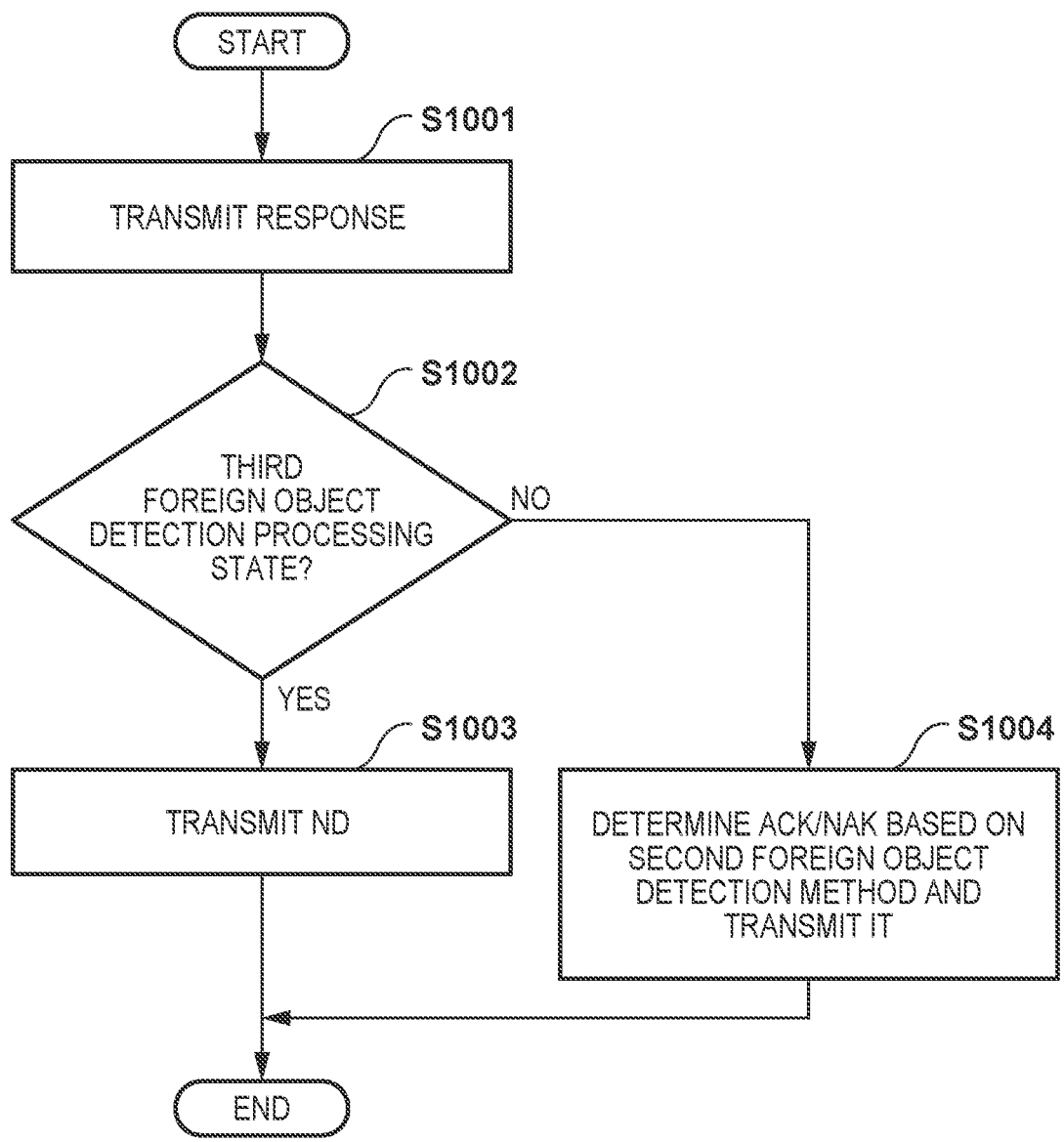

POWER RECEPTION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2021/014482, filed Apr. 5, 2021, which claims the benefit of Japanese Patent Application No. 2020-080694 filed Apr. 30, 2020, both of which are hereby incorporated by reference herein in their entirety.

BACKGROUND

Technical Field

The present disclosure relates to an object detection technique in wireless power transfer.

Background Art

Technology development of wireless power transfer systems has widely been conducted, and a standard (WPC standard) formulated as a wireless power charging standard by a standardization organization, the Wireless Power Consortium (WPC), is widely known. In such wireless power transfer, it is important that if a foreign object exists in a range where a power transmission apparatus can transfer power, the foreign object is detected, and power transmission/reception is controlled. The foreign object is an object different from a power reception apparatus. Japanese Patent Laid-Open No. 2017-070074 describes a method of, if a foreign object exists near a power transmission/reception apparatus complying with the WPC standard, detecting the foreign object and limiting power transmission/reception. Japanese Patent Laid-Open No. 2017-034972 describe a technique of performing foreign object detection by short-circuiting a coil in a wireless power transfer system. Japanese Patent Laid-Open No. 2013-132133 describes a technique of detecting a foreign object based on a change of the Q factor (Quality factor) of a power transmission coil in a wireless power transfer system, which is measured by applying a high-frequency signal to the coil for a predetermined period.

SUMMARY

The present disclosure provides a technique of accurately executing detection of an object different from a power reception apparatus.

According to an aspect of the present disclosure, there is provided a power reception apparatus comprising a power reception unit configured to wirelessly receive power from a power transmission apparatus, a first measurement unit configured to measure a value corresponding to received power in a first period in which the power transmission apparatus limits power transmission, a second measurement unit configured to measure, in a second period, a value corresponding to received power used to detect an object different from the power transmission apparatus and the power reception apparatus based on a relationship between a value corresponding to transmitted power in the power transmission apparatus and a value corresponding to the received power in the power reception apparatus, and a control unit configured to control a timing of the second period such that the first period and the second period do not overlap.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description, serve to explain principles of the present disclosure.

FIG. 5A is a sequence chart showing an example of the procedure of processing executed by a conventional power transmission apparatus and a conventional power reception apparatus.

FIG. 8A is a view for explaining the time relationship between a report of received power and a request of third foreign object detection.

FIG. 8B is a view for explaining the time relationship between a report of received power and a request of third foreign object detection.

FIG. 9B is a flowchart showing an example of the procedure of processing executed by the power reception apparatus.

FIG. 10 is a flowchart showing an example of the procedure of processing executed by the power transmission apparatus.

DESCRIPTION OF THE EMBODIMENTS

Figure 1:
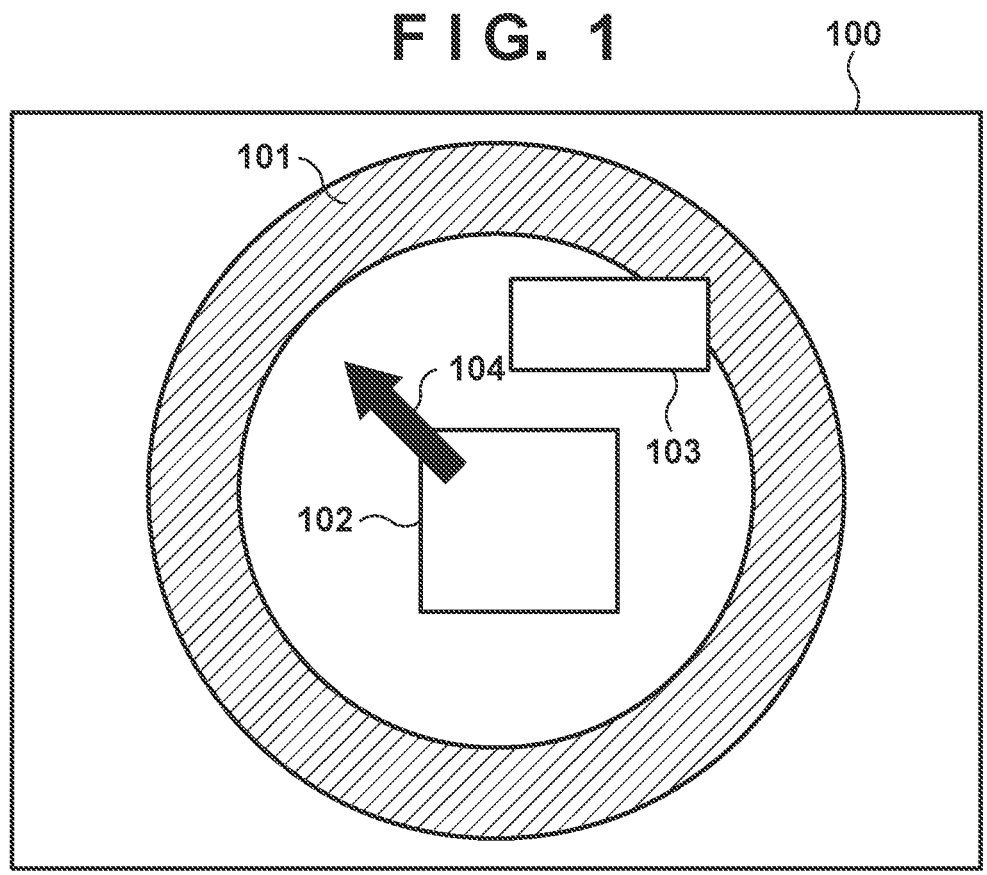
FIG. 1 is a view showing an example of the configuration of a wireless power transfer system.

Hereinafter, embodiments will be described in detail with reference to the attached drawings. Note, the following embodiments are not intended to limit the scope of the present disclosure. Multiple features are described in the embodiments, but limitation is not made to a present disclosure that requires all such features, and multiple such features may be combined as appropriate. Furthermore, in the attached drawings, the same reference numerals are given to the same or similar configurations, and redundant description thereof is omitted.

(System Configuration)

FIG. 1 shows an example of the configuration of a wireless power transfer system according to this embodiment. In an example, the wireless power transfer system is configured to include a power transmission apparatus 100 and a power reception apparatus 102. The power transmission apparatus 100 and the power reception apparatus 102 are assumed to comply with the WPC (Wireless Power Consortium) standard. The power transmission apparatus 100 is an electronic device that wirelessly transmits power to, for example, the power reception apparatus 102 placed on the self-apparatus. The power transmission apparatus 100 wirelessly transmits power to the power reception apparatus 102 via a power transmission coil 101. The power reception apparatus 102 is, for example, an electronic device that receives power from the power transmission apparatus 100 and charges an internal battery. The power reception apparatus 102 may be configured to be incorporated in another apparatus (a camera, a smartphone, a tablet PC, a laptop, an automobile, a robot, a medical device, or a printer) and supply power to these apparatuses. The power transmission apparatus 100 may be a smartphone or the like. In this case, for example, the power reception apparatus 102 may be another smartphone or a wireless earphone. The power reception apparatus 102 may be a transport plane or a vehicle such as an automobile, and the power transmission apparatus 100 may be a charger installed in the console of the transport plane or the vehicle such as an automobile. Note that an arrow 104 indicates that the power reception apparatus 102 moves on the power transmission apparatus 100, and indicates that the positional relationship between the power transmission coil 101 and the power reception coil of the power reception apparatus 102 changes before and after the movement.

FIG. 1 shows a situation in which a conductive foreign object 103 exists in a range (power transmission enable range, operating volume) affected by wireless power output from the power transmission coil 101. If the foreign object 103 exists in the Operating Volume, the power transmission/reception efficiency lowers, and a problem such as heat generation may occur in some cases. It is therefore important for the power transmission apparatus 100 and the power reception apparatus 102 to detect the foreign object 103 and execute power transmission/reception control. In this embodiment, the power transmission apparatus 100 and the power reception apparatus 102 measure a Q factor (Quality factor) from the temporal change of a voltage in the power transmission coil, detect the foreign object 103, and control power transmission/reception within the range of control complying with the WPC standard. Examples of the configurations of the apparatuses for executing such a procedure and the procedure of the processing will be described below in detail. Note that the foreign object 103 is an object different from the power reception apparatus. The foreign object 103 is, for example, a conductive object such as a metal piece or an IC card.

(Configurations of Apparatuses)

Figure 2:
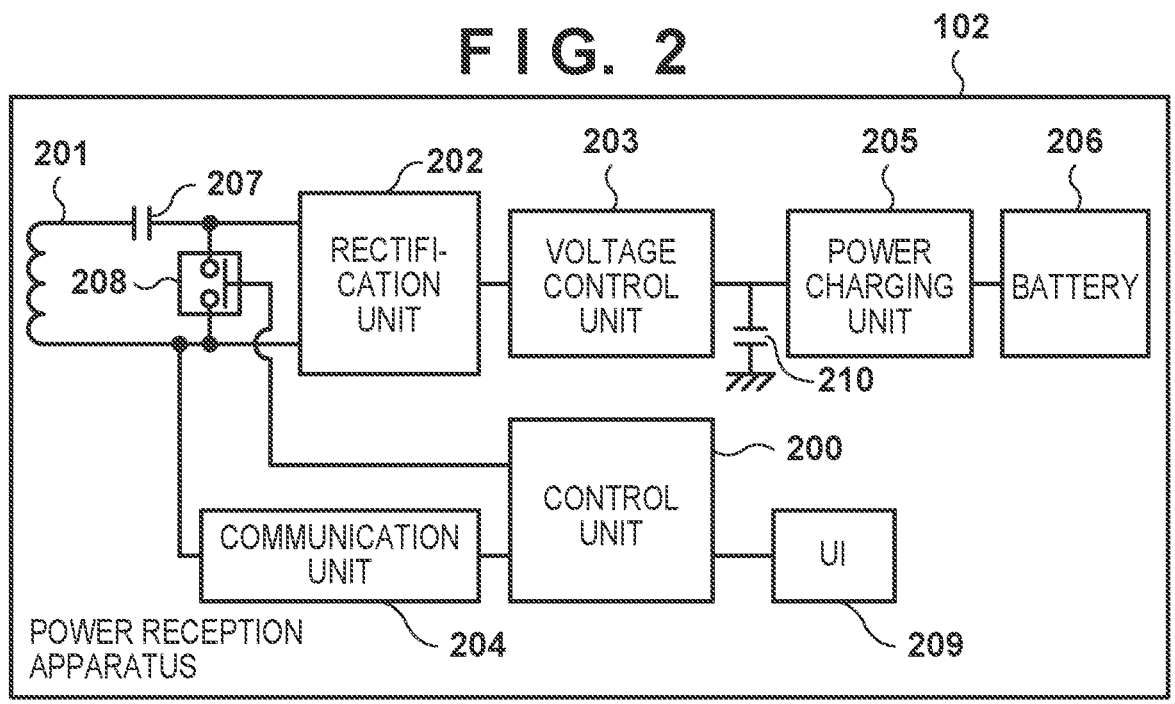
FIG. 2 is a block diagram showing an example of the configuration of a power reception apparatus.

FIG. 2 shows an example of the configuration of the power reception apparatus 102. The power reception apparatus 102 is configured to include, for example, a control unit 200, a power reception coil 201, a rectification unit 202, a voltage control unit 203, a communication unit 204, a power charging unit 205, a battery 206, a resonant capacitor 207, a switch 208, and a UI unit 209. The control unit 200 controls the entire power reception apparatus 102. The control unit 200 is configured to include, for example, one or more processors such as a CPU (Central Processing Unit) and an MPU (Micro Processing Unit). Note that the control unit 200 may include, for example, one or more storage devices such as a RAM (Random Access Memory) and a ROM (Read Only Memory). The control unit 200 can be configured to, for example, execute a program stored in the storage device by the processor, thereby executing each process to be described later. The power reception coil 201 is a coil used to receive power from the power transmission coil 101 of the power transmission apparatus 100. The rectification unit 202 converts an alternating-current voltage and an alternating-current current received via the power reception coil 201 into a direct-current voltage and a direct-current current. The voltage control unit 203 converts the level of the direct-current voltage input from the rectification unit 202 into a level of the direct-current voltage (that is neither too high nor too low) suitable for the operations of the control unit 200, the power charging unit 205, and the like. The voltage control unit 203 also supplies the voltage of the converted level to the power charging unit 205. The power charging unit 205 charges the battery 206 by the voltage supplied from the voltage control unit 203. The communication unit 204 performs control communication of wireless power charging based on WPC standard with respect to the power transmission apparatus 100. The control communication is performed by load-modulating the alternating-current voltage and the alternating-current current received by the power reception coil 201.

Also, the power reception coil 201 is connected to the resonant capacitor 207 and configured to resonate at a specific frequency F2. The switch 208 is a switch configured to short-circuit the power reception coil 201 and the resonant capacitor 207 and is controlled by the control unit 200. If the switch 208 is turned on, the power reception coil 201 and the resonant capacitor 207 form a series resonance circuit. At this time, a current flows only to the closed circuit of the power reception coil 201, the resonant capacitor 207, and the switch 208, and no current flows to the rectification unit 202 and the voltage control unit 203. On the other hand, if the switch 208 is turned off, a current flows to the rectification unit 202 and the voltage control unit 203 via the power reception coil 201 and the resonant capacitor 207.

The UI unit 209 is a user interface (UI) that outputs various kinds of information to the user. The UI unit 209 outputs information by, for example, operations such as screen display, blinking or color change of an LED, voice output by a speaker, and a vibration of the main body of the power reception apparatus 102. The UI unit 209 is configured to include, for example, a liquid crystal panel, a speaker, a vibration motor, and the like. Note that the UI unit 209 may have a function of accepting information input by the user, and can be configured to include, for example, a button, a touch panel, and the like.

An output capacitor 210 is connected between the voltage control unit 203 and the power charging unit 205, and stabilizes the output voltage if, for example, the load abruptly increases in the power charging unit 205 in a short time. Even if power that the voltage control unit 203 can supply abruptly decreases in a short time, the output capacitor 210 can enable supply of a stable voltage to the power charging unit 205 for a predetermined period. Note that the power transmission apparatus 100 sometimes stops power transmission for a short time (for example, from time $T_0$ to time $T_5$ in third foreign object detection processing to be described later in association with FIGS. 11A and 11B). In this case, one of the input power, the input voltage, and the input current of the rectification unit 202 is assumed to stop for a short time or abruptly decrease. The output capacitor 210 is configured to supply a voltage, current, and power enough for the power reception apparatus 102 and the power charging unit 205 serving as a load to operate even in such a case.

Figure 3:
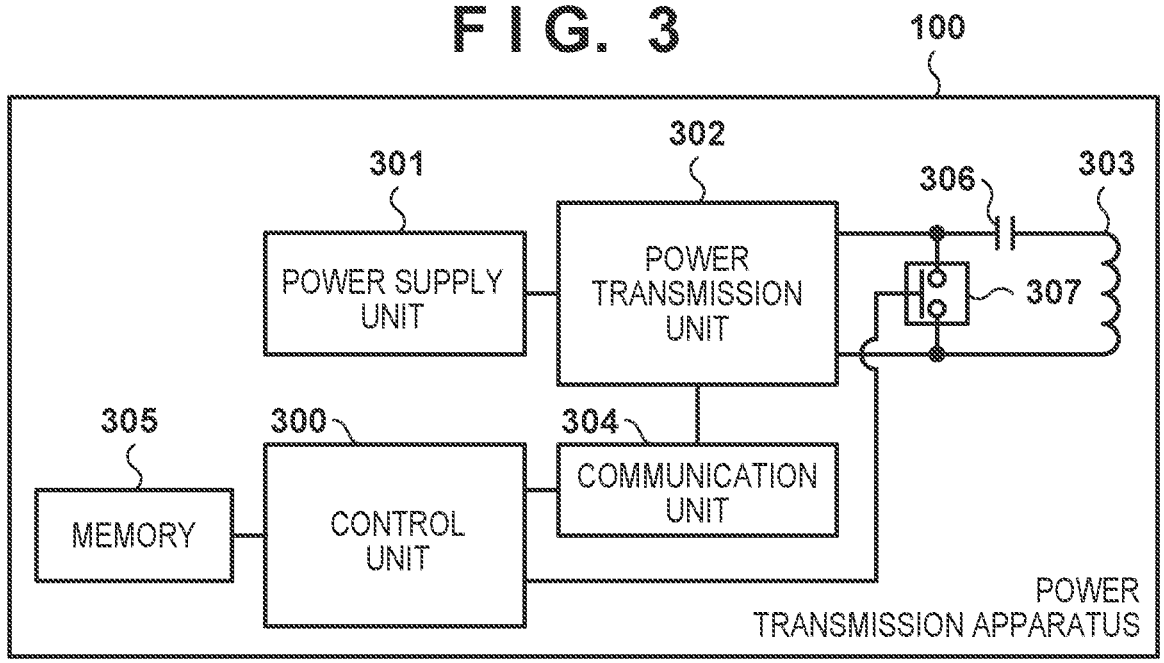
FIG. 3 is a block diagram showing an example of the configuration of a power transmission apparatus.

FIG. 3 shows an example of the configuration of the power transmission apparatus 100. The power transmission apparatus 100 is configured to include, for example, a control unit 300, a power supply unit 301, a power transmission unit 302, a power transmission coil 303, a communication unit 304, a memory 305, a resonant capacitor 306, and a switch 307. The control unit 300 controls the entire power transmission apparatus 100. The control unit 300 is configured to include, for example, one or more processors such as a CPU and an MPU. Note that the control unit 300 can be configured to, for example, execute, by the processor, a program stored in the memory 305 to be described later or a storage device incorporated in the control unit 300, thereby executing each process to be described later. The power supply unit 301 supplies power to each functional block. The power supply unit 301 is, for example, a commercial power supply or a battery. The battery can store power supplied from, for example, a commercial power supply.

The power transmission unit 302 converts direct current or alternating current power input from the power supply unit 301 into alternating current power in a frequency band to be used for wireless power transfer, and inputs the alternating current power to the power transmission coil 303, thereby causing the power transmission coil 303 to generate an electromagnetic wave to be received by the power reception apparatus 102. For example, the power transmission unit 302 converts a direct-current voltage supplied from the power supply unit 301 into an alternating-current voltage by a switching circuit having a half bridge or full bridge configuration using an FET (Field Effect Transistor). In this case, the power transmission unit 302 includes a gate driver that ON/OFF-controls the FET. Also, the power transmission unit 302 adjusts at least one of the voltage (transmission voltage) and the current (transmission current) input to the power transmission coil 303 or a frequency, thereby controlling the intensity or the frequency of the electromagnetic wave to be output. For example, the power transmission unit 302 increases the intensity of the electromagnetic wave by making the transmission voltage or the transmission current large, and decreases the intensity of the electromagnetic wave by making the transmission voltage or the transmission current small. Here, assume that the power transmission unit 302 has a capability of supplying power to output at least power of 15 watt (W) to the power charging unit 205 of the power reception apparatus 102 corresponding to the WPC standard. In addition, the power transmission unit 302 performs output control of alternating current power based on an instruction from the control unit 300 such that the output of the electromagnetic wave from the power transmission coil 303 is started or stopped.

The communication unit 304 performs communication for power transmission control based on the WPC standard with the power reception apparatus 102 via the power transmission coil 303. The communication unit 304 modulates an alternating-current voltage and an alternating-current current output from the power transmission unit 302 using frequency modulation (FSK (Frequency Shift Keying)) and transfers the information to the power reception apparatus 102. In addition, the communication unit 304 demodulates an alternating-current voltage and an alternating-current current modulated by load modulation of the communication unit 204 of the power reception apparatus 102, thereby obtaining information transmitted from the power reception apparatus 102. That is, the communication unit 304 superimposes information to be transmitted to the power reception apparatus 102 on the electromagnetic wave transmitted from the power transmission unit 302 and detects a power reception signal superimposed on the electromagnetic wave by the power reception apparatus 102, thereby communicating with the power reception apparatus 102. Also, the communication unit 304 may communicate with the power reception apparatus 102 in accordance with a standard different from the WPC standard using a coil (or antenna) different from the power transmission coil 303. In addition, the communication unit 304 may communicate with the power reception apparatus 102 by selectively using a plurality of communication functions. The memory 305 stores, for example, control programs to be executed by the control unit 300 and information such as the states of the power transmission apparatus 100 and the power reception apparatus 102. For example, the state of the power transmission apparatus 100 is obtained by the control unit 300. The state of the power reception apparatus 102 is obtained by the control unit 200 of the power reception apparatus 102 and transmitted from the communication unit 204. The power transmission apparatus 100 obtains information representing the state via the communication unit 304.

The power transmission coil 303 is connected to the resonant capacitor 306 and configured to resonate at a specific frequency F1. The switch 307 is a switch configured to short-circuit the power transmission coil 303 and the resonant capacitor 306 and is controlled by the control unit 300. If the switch 307 is turned on, the power transmission coil 303 and the resonant capacitor 306 form a series resonance circuit. At this time, a current flows only to the closed circuit of the power transmission coil 303, the resonant capacitor 306, and the switch 307. If the switch 307 is turned off, power is supplied from the power transmission unit 302 to the power transmission coil 303 and the resonant capacitor 306.

Figure 4:
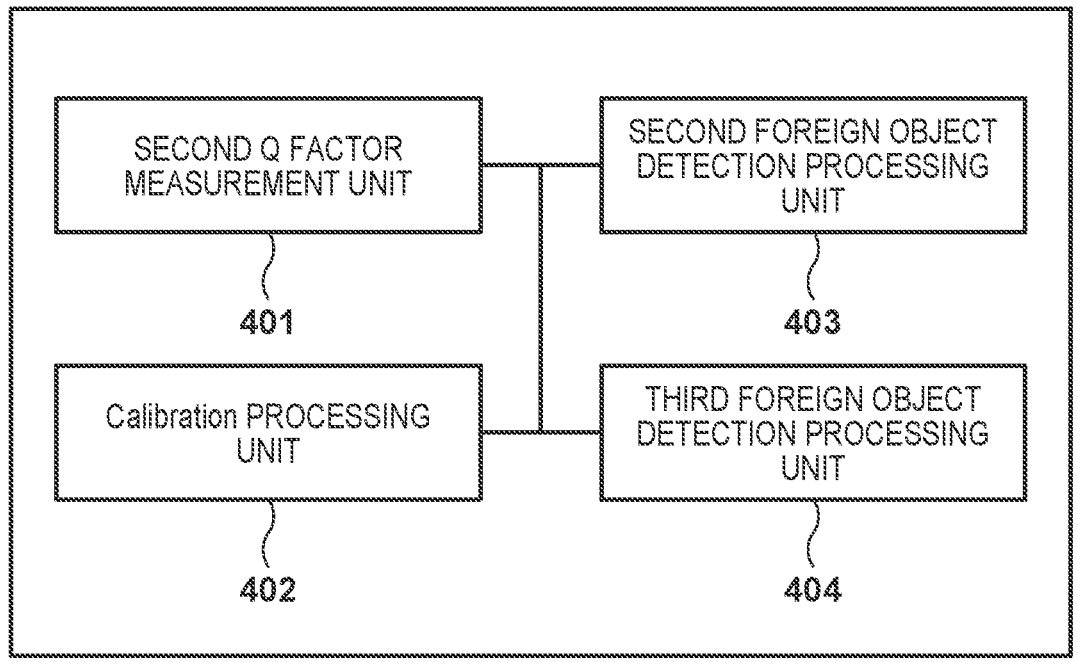
FIG. 4 is a block diagram showing an example of the functional configuration of the control unit of the power reception apparatus.

FIG. 4 shows an example of the functional configuration of the control unit 200 of the power reception apparatus 102. The control unit 200 includes, for example, a second Q factor measurement unit 401, a Calibration processing unit 402, a second foreign object detection processing unit 403, and a third foreign object detection processing unit 404. The second Q factor measurement unit 401 performs measurement of a Q factor in a time domain (second Q factor measurement), as will be described later. The Calibration processing unit 402 notifies the power transmission apparatus 100 of received power necessary for obtaining of a Calibration data Point and Calibration curve creation processing, as will be described later. The second foreign object detection processing unit 403 executes foreign object detection processing (second foreign object detection processing) based on a power loss method to be described later. The third foreign object detection processing unit 404 executes foreign object detection processing (third foreign object detection processing) based on a Q factor measured by the second Q factor measurement unit 401. The processing units shown in FIG. 4 are configured as, for example, a plurality of independent programs, and can operate concurrently while establishing synchronization between the plurality of programs by event processing or the like.

(Foreign Object Detection Method in WPC Standard)

Foreign object detection methods defined by the WPC (Wireless Power Consortium) standard will be described next using the power transmission apparatus 100 and the power reception apparatus 102 as an example. A foreign object detection method (first foreign object detection method) based on a Q factor measured in a frequency domain and a foreign object detection method (second foreign object detection method) based on a power loss method will be described here.

(1) Foreign Object Detection Method Based on Q Factor Measured in Frequency Domain (First Foreign Object Detection Method)

In the first foreign object detection method, first, the power transmission apparatus 100 measures, in the frequency domain, a Q factor that changes due to the influence of a foreign object (first Q factor measurement). This measurement is executed after the power transmission apparatus 100 transmits an Analog Ping until a Digital Ping is transmitted (see F501 in FIG. 5A). For example, to measure the Q factor, the power transmission unit 302 sweeps the frequency of wireless power output from the power transmission coil 303, and the power transmission apparatus 100 measures the voltage value at the terminal portion of the resonant capacitor 306 connected in series (or in parallel) with the power transmission coil. The power transmission apparatus 100 searches for a resonance frequency at which the voltage value exhibits a peak, and calculates the Q factor of the power transmission coil 303 from the resonance frequency and a frequency indicating a voltage value lower by 3 dB than the peak voltage value measured at the resonance frequency.

The Q factor may be measured by another method. For example, the power transmission unit 302 sweeps the frequency of wireless power output from the power transmission coil 303, and the power transmission apparatus 100 measures the voltage value at the terminal portion of the resonant capacitor 306 connected in series with the power transmission coil 303, and searches for a resonance frequency at which the voltage value exhibits a peak. Then, the power transmission apparatus 100 measures the voltage values at the two terminals of the resonant capacitor 306 at the resonance frequency, and calculates the Q factor of the power transmission coil 303 based on the ratio of the voltage values at the two terminals.

After the Q factor of the power transmission coil 303 is calculated, the control unit 300 of the power transmission apparatus 100 obtains a Q factor serving as the judgement criterion of foreign object detection from the power reception apparatus 102 via the communication unit 304. For example, the control unit 300 receives, from the power reception apparatus 102, the Q factor (first characteristic value) of the power transmission coil in a case where the power reception apparatus is placed on the power transmission coil defined by the WPC standard. The Q factor is stored in an FOD (Foreign Object Detection) Status packet transmitted from the power reception apparatus 102, and the power transmission apparatus 100 receives the FOD Status packet, thereby obtaining the Q factor. The control unit 300 estimates, from the obtained Q factor, the Q factor of the power transmission coil 303 in a case where the power reception apparatus 102 is placed on the power transmission apparatus 100. In this embodiment, the estimated Q factor will be expressed as a first reference Q factor. Note that the Q factor stored in the FOD Status packet can be stored in the nonvolatile memory (not shown) of the power reception apparatus 102 in advance. That is, the power reception apparatus 102 can notify the power transmission apparatus 100 of the Q factor stored in advance. Note that the Q factor corresponds to Q1 to be described later.

The control unit 300 of the power transmission apparatus 100 compares the first reference Q factor with the Q factor measured by the power transmission apparatus 100, and determines the presence/absence of a foreign object based on the comparison result. For example, using a Q factor lower by a % (first ratio) than the first reference Q factor as a threshold, if the measured Q factor is lower than the threshold, the control unit 300 determines that the possibility of presence of a foreign object is high, and otherwise, determines that the possibility of absence of a foreign object is high.

(2) Foreign Object Detection Method Based on Power Loss Method (Second Foreign Object Detection Method)

Figure 12:
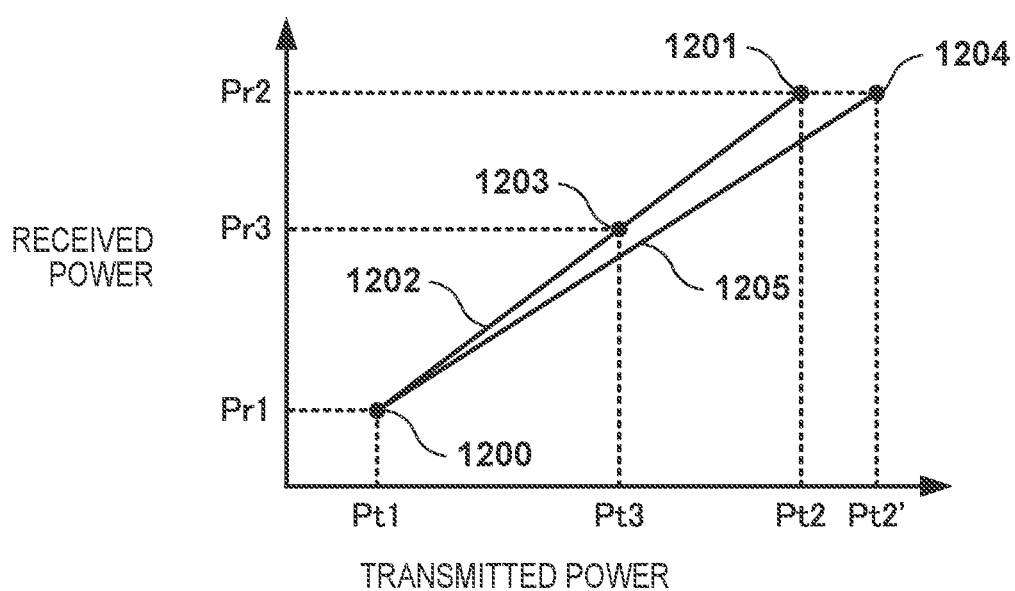
FIG. 12 is a conceptual view of foreign object detection by a power loss method.

A foreign object detection method based on the power loss method defined by the WPC standard will be described next with reference to FIG. 12. FIG. 12 is a conceptual view of foreign object detection by the power loss method. The abscissa represents transmitted power of the power transmission apparatus 100, and the ordinate represents received power of the power reception apparatus 102.

First, the power transmission unit 302 of the power transmission apparatus 100 transmits a Digital Ping to the power reception apparatus 102. The Calibration processing unit 402 of the power transmission apparatus 100 notifies the power transmission apparatus 100 of a received power value Pr1 (called Light Load) in the power reception apparatus 102 at the time of reception of the Digital Ping. The received power value includes at least power to be input to the power charging unit 205. Note that this notification is made using a Received Power Packet (mode1). The Received Power Packet (mode1) will be referred to as "RP1" hereinafter. At this time, the power reception apparatus 102 does not supply received power to loads (the power charging unit 205 and the battery 206). The control unit 300 of the power transmission apparatus 100 stores, in the memory 305, the relationship (a point 1200 shown in FIG. 12) between the received power Pr1 represented by the received RP1 and a transmitted power value Pt1 at the time of obtaining Pr1. Accordingly, the power transmission apparatus 100 can recognize that the power loss amount between the power transmission apparatus 100 and the power reception apparatus 102 when Pt1 is transmitted as the transmitted power is Pt1-Pr1 (Ploss1).

Next, the Calibration processing unit 402 of the power reception apparatus 102 notifies the power transmission apparatus 100 of the value of a received power value Pr2 (called Connected Load) in the power reception apparatus 102. This notification is made using a Received Power Packet (mode2). Note that the Received Power Packet (mode2) will be referred to as "RP2" hereinafter. At this time, the power reception apparatus 102 supplies received power to the loads. The control unit 300 of the power transmission apparatus 100 stores, in the memory 305, the relationship (a point 1201 shown in FIG. 12) between the received power Pr2 represented by the received RP2 and a transmitted power value Pt2 at the time of obtaining Pr2. Accordingly, the power transmission apparatus 100 can recognize that the power loss amount between the power transmission apparatus 100 and the power reception apparatus 102 when Pt2 is transmitted as the transmitted power is Pt2-Pr2 (Ploss2). Note that the transmitted power value is a value including at least power output from the power transmission unit 302 to the power transmission coil 303.

The control unit 300 of the power transmission apparatus 100 linearly interpolates the points 1200 and 1201, thereby creating a line 1202. The line 1202 corresponds to the relationship between the transmitted power and the received power in a state in which no foreign object exists around the power transmission apparatus 100 and the power reception apparatus 102. Hence, the power transmission apparatus 100 can predict, from the transmitted power value and the line 1202, received power in a state in which the possibility of absence of a foreign object is high. For example, as for a case where the transmitted power value is Pt3, the power transmission apparatus 100 can predict that the received power value is Pr3 from a point 1203 on the line 1202 corresponding to the case where the transmitted power value is Pt3.

Here, assume that if the power transmission unit 302 of the power transmission apparatus 100 transmits power to the power reception apparatus 102 by the transmitted power Pt3, the communication unit 304 receives a received power value Pr3' from the power reception apparatus 102. The control unit 300 of the power transmission apparatus 100 calculates Pr3-Pr3'(=Ploss_FO) that is a value obtained by subtracting the received power value Pr3' actually received from the power reception apparatus 102 from the received power value Pr3 in a state in which a foreign object does not exist. Ploss_FO can be considered as a power loss consumed by a foreign object when the foreign object exists between the power transmission apparatus 100 and the power reception apparatus 102. Hence, if the power Ploss_FO that would be consumed by the foreign object exceeds a predetermined threshold, the control unit 300 of the power transmission apparatus 100 can judge that a foreign object exists. The threshold is derived based on, for example, the relationship between the point 1200 and the point 1201. Note that even if the foreign object exists not between the TX and the RX but within the power transmission enable range, it receives power and generates heat.

Also, the control unit 300 of the power transmission apparatus 100 obtains, in advance, a power loss amount Pt3-Pr3 (Ploss3) between the power transmission apparatus 100 and the power reception apparatus 102 from the received power value Pr3 in a state in which a foreign object does not exist. The control unit 300 of the power transmission apparatus 100 calculates a power loss amount Pt3-Pr3' (Ploss3') between the power transmission apparatus 100 and the power reception apparatus 102 in a state in which a foreign object exists from the received power value Pr3' received from the power reception apparatus 102 in a state in which it is unclear whether a foreign object exists. Then, the control unit 300 of the power transmission apparatus 100 calculates Ploss3'-Ploss3. If the value exceeds a predetermined threshold, it can be judged that a foreign object exists. Note that Ploss3'-Ploss3=Pt3-Pr3'-Pt3+Pr3=Pr3-Pr3'. Hence, the power Ploss_FO predicted to be consumed by the foreign object can be estimated by comparing the power loss amounts.

As described above, the power Ploss_FO that would be consumed by the foreign object may be calculated as Pr3-Pr3' that is the difference of received power, or may be calculated as Ploss3'-Ploss3 (=Ploss_FO) that is the difference of power loss.

After the line 1202 is obtained, the control unit 300 of the power transmission apparatus 100 periodically receives the current received power value (for example, Pr3' described above) from the power reception apparatus 102 via the communication unit 304. The current received power value periodically transmitted from the Calibration processing unit 402 of the power reception apparatus 102 is transmitted as a Received Power Packet (mode0) to the power transmission apparatus 100. The control unit 300 of the power transmission apparatus 100 performs foreign object detection based on the line 1202 and the received power value stored in the Received Power Packet (mode0). Note that the Received Power Packet (mode0) will be referred to as (RP0) hereinafter.

Note that in this embodiment, the points 1200 and 1201 used to obtain the line 1202 representing the relationship between the transmitted power and the received power in a state in which a foreign object does not exist around the power transmission apparatus 100 and the power reception apparatus 102 will be referred to as "Calibration data Points". In addition, a line segment (line 1202) obtained by interpolating at least two Calibration data Points will be referred to as "Calibration curve". The Calibration data Points and the Calibration curve (second reference) are used for foreign object detection processing by the control unit 300 of the power transmission apparatus 100.

(Q Factor Measuring Method in Time Domain)

Figure 11A:
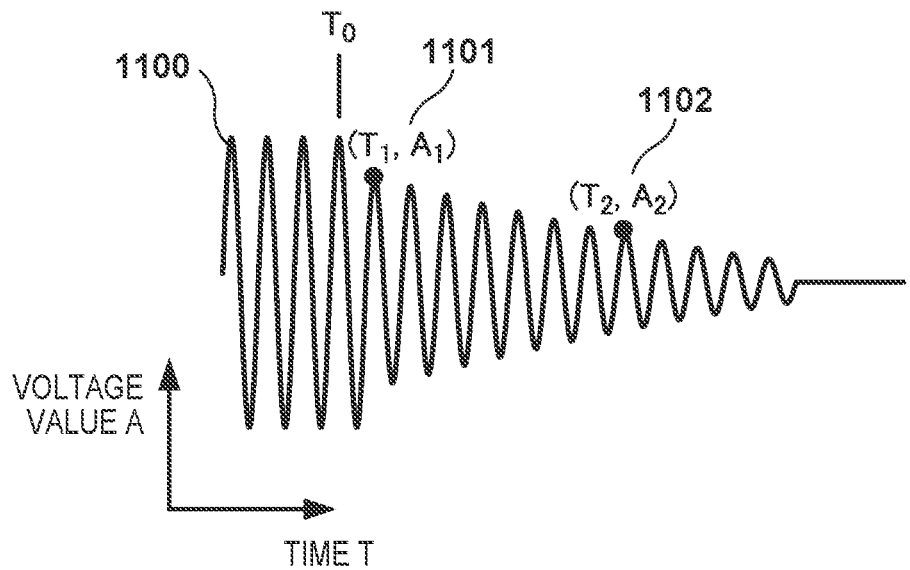
FIG. 11A is a conceptual view for explaining a Q factor measuring method in a time domain.
Figure 11B:
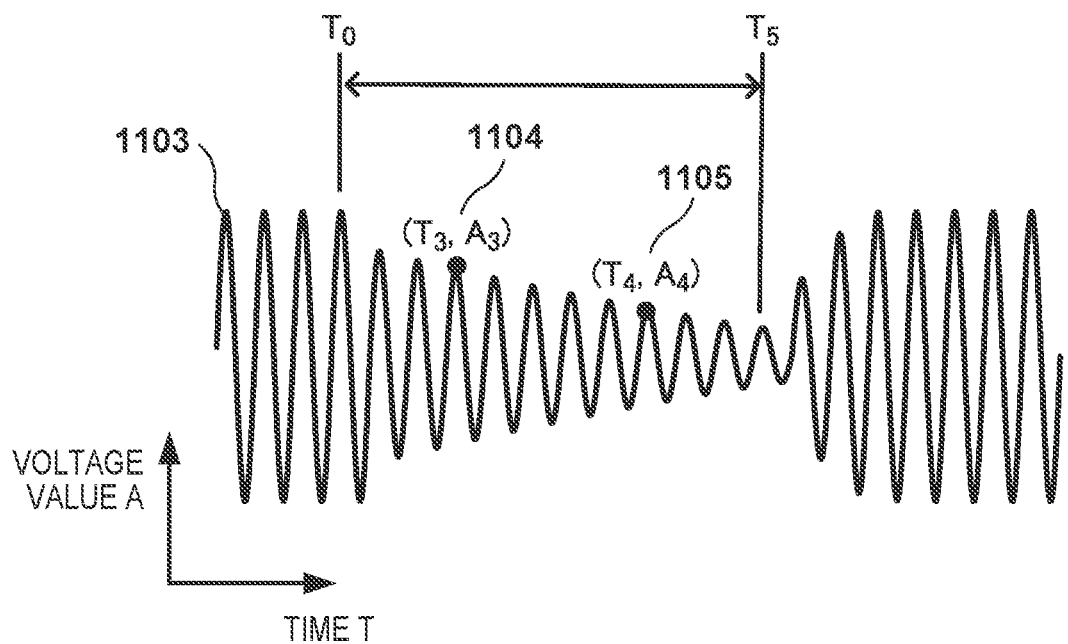
FIG. 11B is a conceptual view for explaining a Q factor measuring method in a time domain.

A Q factor measuring method in a time domain will be described with reference to FIGS. 11A and 11B. FIGS. 11A and 11B are conceptual views for explaining a method of measuring a Q factor in a time domain (second Q factor measurement). In this embodiment, a foreign object detection method based on the second Q factor will be referred to as a third foreign object detection method. In the power reception apparatus 102, the second Q factor measurement is performed by the second Q factor measurement unit 401. In the second Q factor measurement, the power transmission apparatus 100 and the power reception apparatus 102 turn on the switches in the same period to instantaneously disconnect power transmission so the received power is not supplied to the loads. According to this, for example, the voltage applied to the coil gradually decreases. The second Q factor is calculated based on how the voltage decreases.

A waveform 1100 shown in FIG. 11A represents the elapsed time of the voltage value of the power transmission coil or the power reception coil. Note that the voltage value of the power transmission coil or the power reception coil can be the value of a high-frequency voltage applied to the terminal portion of the power transmission coil 303 of the power transmission apparatus 100 or the power reception coil 201 of the power reception apparatus 102. Alternatively, the voltage value of the power transmission coil or the power reception coil here may be the value of a high-frequency voltage applied to the terminal portion of the resonant capacitor 306 of the power transmission apparatus 100 or the resonant capacitor 207 of the power reception apparatus 102. Note that in FIGS. 11A and 11B, the abscissa represents time, and the ordinate represents the voltage value. At time $T_0$, the power transmission apparatus 100 stops application of the high-frequency voltage (power transmission) to the power transmission coil 303 or the resonant capacitor 306. According to this, the voltage value in the power transmission coil 303 or the resonant capacitor 306 of the power transmission apparatus 100 gradually decreases, and the voltage value in the power reception coil 201 or the resonant capacitor 207 of the power reception apparatus 102 gradually decreases. A point 1101 is a point on the envelope of the high-frequency voltage, and represents the high-frequency voltage at time $T_1$. In FIG. 11A, ($T_1$, $A_1$) represents that the voltage value at time $T_1$ is $A_1$. Similarly, a point 1102 is a point on the envelope of the high-frequency voltage, and represents the high-frequency voltage at time $T_2$. In FIG. 11A, ($T_2$, $A_2$) represents that the voltage value at time $T_2$ is $A_2$.

Q factor measurement is executed based on the temporal change of the voltage value from time $T_0$. For example, based on the times and the voltage values of the points 1101 and 1102 as the envelope of the voltage value, and a frequency f (f will be referred to as an operating frequency hereinafter) of the high-frequency voltage, the Q factor is calculated by $$Q = \pi f \frac{t_2 - t_1}{\ln\left(\frac{A_1}{A_2}\right)} \quad (1)$$

That is, the Q factor here is an electrical characteristic determined by the relationship between the elapsed time of the power transmission coil 303 and the voltage drop amount at that time after power transmission is limited (stopped).

Processing of the power reception apparatus 102 measuring the Q factor in the time domain in this embodiment will be described next with reference to FIG. 11B. A waveform 1103 represents the value of a high-frequency voltage applied to the power reception coil 201, and its frequency falls within the range of 110 kHz to 148.5 kHz, which is used in the Qi standard. Also, each of points 1104 and 1105 is a part of the envelope of the voltage value. As described above, the power transmission apparatus 100 stops power transmission in the section from time $T_0$ to $T_5$. The control unit 300 of the power transmission apparatus 100 turns on the switch 307, thereby forming a resonant circuit including the power transmission coil 303 and the resonant capacitor 306. Also, upon detecting the stop of power transmission by the power transmission apparatus 100 by observing the voltage value of the power reception coil 201, the control unit 200 of the power reception apparatus 102 turns on the switch 208, thereby forming a resonant circuit including the power reception coil 201 and the resonant capacitor 207. The second Q factor measurement unit 401 of the power reception apparatus 102 measures the Q factor based on a voltage value $A_3$ (point 1104) at time $T_3$, a voltage value $A_4$ (point 1105) at time $T_4$, and the operating frequency of the high-frequency voltage (equation (1)). Note that the power transmission apparatus 100 resumes power transmission at time $T_5$. Upon detecting the resumption of power transmission at time $T_5$ by observing the voltage value of the power reception coil 201, the control unit 200 of the power reception apparatus 102 turns off the switch 208, thereby opening the resonant circuit including the power reception coil 201 and the resonant capacitor 207. As described above, in the second Q factor measurement, during the instantaneous disconnection of power transmission by the power transmission apparatus 100, the second Q factor measurement unit 401 of the power reception apparatus 102 measures the Q factor based on the elapsed time, the voltage value, and the operating frequency.

In foreign object detection (first foreign object detection method) based on a Q factor (first Q factor) measured in the frequency domain, the frequency is swept to search for a resonance frequency every time the measurement is performed. If such sweeping is executed when the power transmission apparatus 100 is transmitting relatively large power for the Digital Ping or the Power Transfer phase, switching noise in the power transmission unit 302 may increase. On the other hand, foreign object detection (third foreign object detection method) based on a Q factor (second Q factor) measured in the time domain can be executed using a single frequency, and the frequency need not be swept. For this reason, the method can be executed at the operating frequency during power transmission for the Digital Ping or the Power Transfer phase, and the influence on switching noise is little. Hence, the third foreign object detection method can be executed at the operating frequency during power transmission for the Digital Ping or the Power Transfer phase, and switching noise can be reduced even during transmission of large power, as compared to the first foreign object detection method.

(Operations of Conventional Power Transmission Apparatus and Power Reception Apparatus)

The operations of the conventional power transmission apparatus 100 and the conventional power reception apparatus 102 will be described with reference to FIG. 5A. In the description of FIG. 5A, it is assumed that the power transmission apparatus 100 and the power reception apparatus 102 are a power transmission apparatus and a power reception apparatus, which comply with the WPC standard v1.2.3.

The power transmission apparatus 100 transmits an Analog Ping to detect an object existing near the power transmission coil 303 (F500). The Analog Ping is pulse-shaped power, and is power used to detect an object. Even if the power reception apparatus 102 receives the Analog Ping, this power is too small to activate the control unit 200. By the Analog Ping, the power transmission apparatus 100 detects an object based on a shift of the resonance frequency of the voltage value in the power transmission coil 303, which is caused by an object existing near the power transmission coil 303, or a change of the voltage value/current value flowing to the power transmission coil 303. Upon detecting an object by the Analog Ping, the power transmission apparatus 100 measures the Q factor of the power transmission coil 303 by the above-described first Q factor measurement (F501). If the first Q factor measurement is ended, the power transmission apparatus 100 starts transmission of a Digital Ping (F502). The Digital Ping is power used to activate the control unit 200 of the power reception apparatus 102, and is power larger than the Analog Ping. The Digital Ping is transmitted continuously from then on. That is, the power transmission apparatus 100 continuously transmits power equal to or larger than the Digital Ping after the start of transmission of the Digital Ping (F502) until reception of EPT (End Power Transfer) data from the power reception apparatus 102 (F524).

When activated by receiving the Digital Ping, the power reception apparatus 102 stores the voltage value of the received Digital Ping in Signal Strength data and transmits it to the power transmission apparatus 100 (F503). Next, the power reception apparatus 102 transmits ID data storing an ID including the version information of the WPC standard with which the power reception apparatus 102 complies and device identification information (F504) to the power transmission apparatus 100. Furthermore, the power reception apparatus 102 transmits, to the power transmission apparatus 100, Configuration data including information such as the maximum value of power to be supplied from the voltage control unit 203 to the load (power charging unit 205) (F505). The power transmission apparatus 100 receives the ID data and the Configuration data. Upon determining based on these data that the power reception apparatus 102 supports an extension protocol (including Negotiation to be described later) after the WPC standard v1.2, the power transmission apparatus 100 responds by an ACK (acknowledgement) (F506).

The power reception apparatus 102 receives the ACK and transits to a Negotiation phase to negotiate about power to be transmitted/received. First, the power reception apparatus 102 transmits FOD Status data to the power transmission apparatus 100 (F507). In this embodiment, the FOD Status data will be referred to as "FOD(Q1)". The power transmission apparatus 100 performs foreign object detection by the first foreign object detection method based on the Q factor stored in the received FOD(Q1) (the Q factor measured in the frequency domain) and the Q factor measured by the first Q factor measurement. Upon determining that the possibility of absence of a foreign object is high, the power transmission apparatus 100 transmits an ACK representing the determination result to the power reception apparatus 102 (F508).

Upon receiving the ACK, the power reception apparatus 102 transmits, to the power transmission apparatus 100, a General Request (Capability) that is data for inquiring capability and is one of General Requests defined by the WPC standard (F509). This data is called GRQ(CAP). Upon receiving the GRQ(CAP), the power transmission apparatus 100 transmits Capability data (to be referred to as CAP) storing capability information that the self-apparatus supports (F510).

Next, the power reception apparatus 102 negotiates about Guaranteed Power (GP) that is the maximum value of the power value that the power reception apparatus 102 requests to receive. The Guaranteed Power is the maximum value of the load power of the power reception apparatus 102 (power to be consumed by the battery 206), which is agreed between the power transmission apparatus 100 and the power reception apparatus 102. This negotiation is implemented by transmitting, to the power transmission apparatus 100, data storing the value of Guaranteed Power requested by the power reception apparatus 102 in Specific Request data defined by the WPC standard (F511). In this embodiment, this data will be referred to as "SRQ(GP)". The power transmission apparatus 100 responds to the SRQ(GP) in consideration of the power transmission capability of its own, and the like. Upon judging that the Guaranteed Power is acceptable, the power transmission apparatus 100 transmits an ACK representing that the request is accepted (F512). In this embodiment, assume that the power reception apparatus 102 requests 15 W as the Guaranteed Power by SRQ(GP). If negotiation of a plurality of parameters including Guaranteed Power is ended, the power reception apparatus 102 transmits, to the power transmission apparatus, "SRQ(EN)" that requests the end of negotiation (End Negotiation) in the Specific Request (F513). The power transmission apparatus 100 transmits an ACK to the SRQ(EN) (F514), ends the Negotiation, and transits to a Power Transfer phase to transmit/receive power defined by the Guaranteed Power.

Next, the power transmission apparatus 100 executes foreign object detection (second foreign object detection method) based on the above-described power loss method. First, the power transmission apparatus 100 receives RP1 from the power reception apparatus 102 (F515). The power transmission apparatus 100 accepts, as a Calibration data Point (corresponding to the point 1200 in FIG. 12), the received power value stored in the RP1 and the transmitted power value of the power transmission apparatus 100 when the received power value is obtained. The power transmission apparatus 100 transmits an ACK representing the acceptance of the Calibration data Point to the power reception apparatus 102 (F516).

After reception of the ACK, the power reception apparatus 102 transmits, to the power transmission apparatus 100, Control Error (to be expressed as CE hereinafter) that requests the power transmission apparatus 100 to increase/decrease the received voltage (or received current or received power). The CE stores a sign and a numerical value. If the sign is plus, it means that the received voltage is requested to be increased. If the sign is minus, it means that the received voltage is requested to be decreased. If the numerical value is zero, it means that the received voltage is requested to be maintained. Here, the power reception apparatus 102 transmits CE(+) representing that the received voltage is increased to the power transmission apparatus 100 (F517).

Upon receiving CE(+), the power transmission apparatus 100 changes the set value of the power transmission unit 302 to increase the transmitted voltage (F518). When the received power increases in response to CE(+), the power reception apparatus 102 supplies the received power to the loads (the power charging unit 205 and the battery 206), and transmits the RP2 to the power transmission apparatus 100 (F519). The power transmission apparatus 100 accepts, as a Calibration data Point (corresponding to the point 1201 in FIG. 12), the received power value stored in the RP2 and the transmitted power value of the power transmission apparatus 100 at that time. The power transmission apparatus 100 transmits an ACK representing the acceptance of the Calibration data Point to the power reception apparatus 102 (F520). Since the power transmission apparatus 100 has obtained the two Calibration data Points (the points 1200 and 1201 in FIG. 12) at this point of time, a Calibration curve (the line 1202 in FIG. 12) can be derived.

The power transmission apparatus 100 and the power reception apparatus 102 have transited to the Power Transfer phase at this point of time, and the power transmission apparatus 100 is transmitting the power that enables the power reception apparatus 102 to receive the maximum power of 15 W negotiated in the Negotiation phase. The power reception apparatus 102 periodically transmits, to the power transmission apparatus 100, a CE that requests the power transmission apparatus 100 to maintain the transmitted power and the RP0 storing the current received power value (F521 and F522). Upon receiving the RP0 from the power reception apparatus 102, the power transmission apparatus 100 performs foreign object detection based on the above-described second foreign object detection method. Upon determining, as the result of foreign object detection, that the possibility of absence of a foreign object is high, the power transmission apparatus 100 transmits an ACK to the power reception apparatus 102 (F523). Note that upon determining that the possibility of presence of a foreign object is high, the power transmission apparatus 100 transmits an NAK to the power reception apparatus 102. After that, if power charging to the battery 206 is ended, the power reception apparatus 102 transmits EPT (End Power Transfer) data that requests stop of power transmission to the power transmission apparatus 100 (F524).

In the above-described way, wireless power transfer is performed between the power transmission apparatus 100 and the power reception apparatus 102, which comply with the WPC standard v1.2.3.

In the first foreign object detection method, a foreign object at the timing when the power transmission apparatus 100 performs measurement of the first Q factor in F501 is detected in the above-described way. On the other hand, even if the foreign object 103 is placed in the Operating Volume after the measurement of the first Q factor until the Calibration data Point is obtained (for example, until the ACK is transmitted in F516), the foreign object 103 is not detected. This is because in the first foreign object detection method, the power transmission apparatus 100 only determines, at the time of reception of FOD(Q1), the presence/absence of a foreign object at the time of measurement of the first Q factor in F501.

Also, in the second foreign object detection method, during the time in which the Calibration curve (line 1202) is not generated, even if the foreign object 103 is placed in the Operating Volume, foreign object detection cannot be performed. That is, foreign object detection cannot be performed at the stage when the power reception apparatus 102 obtains the RP1 and the first Calibration data Point (point 1200) in F515. After that, when the power transmission apparatus 100 transmits an ACK in F520, obtains the next Calibration data Point (point 1201), and generates a Calibration curve (line 1202), the foreign object 103 can be detected. For example, if the foreign object 103 is placed in the Operating Volume immediately after the power reception apparatus 102 transmits CE(+) in F517, the foreign object 103 is not detected because the Calibration curve is not generated yet at this point time. Also, at this point of time, first foreign object detection processing is not performed, as a matter of course.

Also, for example, if the foreign object 103 is placed immediately after CE(+) is transmitted in F517, the power transmission apparatus 100 obtains the Calibration data Point in a state in which the foreign object 103 exists. In this case, the power transmission apparatus 100 cannot perform accurate second foreign object detection processing after that. For example, if the foreign object 103 exists in the Operating Volume, the transmitted power of the power transmission apparatus 100 is consumed by the foreign object 103. As a result, as shown in FIG. 12, the transmitted power of the power transmission apparatus 100 when the power reception apparatus 102 obtains the received power Pr2 is Pt2' ($\neq$Pt2) that is a value obtained by adding the power consumed by the foreign object to the power (Pt2) provided to the power reception apparatus 102. Hence, the power transmission apparatus 100 obtains a point 1204 as a Calibration data Point, and as a result, creates a line 1205 as a Calibration curve. The second foreign object detection method is a method of creating a Calibration curve in a state in which no foreign object is placed, as described above, and detecting the presence of a foreign object by checking the divergence between the curve and the combination of actually measured transmitted power and received power. On the other hand, since the line 1205 is a Calibration curve created under the influence of a foreign object, accurate foreign object detection cannot be performed. Also, even in a case where the foreign object 103 is placed in the Operating Volume after the power transmission apparatus 100 measures the first Q factor in F501 until the power reception apparatus 102 transmits RP1 in F515, the accuracy of foreign object detection by the second foreign object detection method lowers. This is because the Calibration data Point obtained when the power reception apparatus 102 transmits an ACK (F516) is created in a state in which the foreign object 103 exists in the Operating Volume.

As described above, if the foreign object 103 is placed after the measurement of the first Q factor until generation of the Calibration curve, the foreign object 103 cannot be detected, and use of the second foreign object detection method after that may be difficult.

In this embodiment, the third foreign object detection method is applied to the WPC standard in consideration of this situation. For example, the power transmission apparatus 100 and the power reception apparatus 102 confirm by the third foreign object detection method that the possibility of absence of a foreign object is high, and then create a Calibration data Point. This processing will be described with reference to FIGS. 5B and 5C.

Figure 5B:
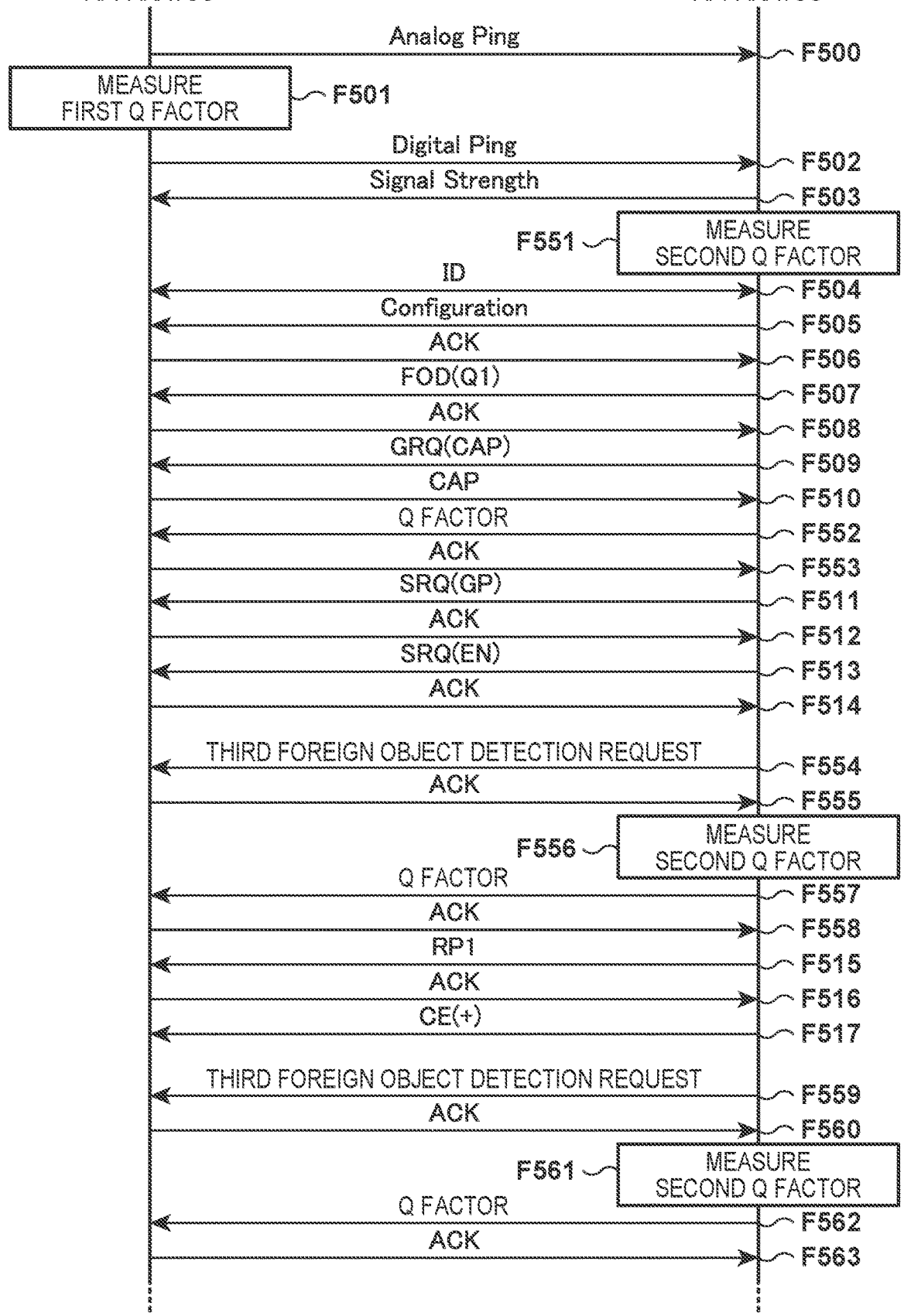
FIG. 5B is a sequence chart showing an example of the procedure of processing executed by the power transmission apparatus and the power reception apparatus according to the embodiment.

First, in F500 to F503, the power transmission apparatus 100 and the power reception apparatus 102 execute the same processing as in FIG. 5A. In F503, the power transmission apparatus 100 receives Signal Strength from the power reception apparatus 102, and stops power transmission, as described with reference to FIG. 11B, to perform third foreign object detection. Upon detecting the stop of power transmission, the power reception apparatus 102 operates as described with reference to FIG. 11B to execute second Q factor measurement (F551). The power reception apparatus 102 receives an ACK to FOD(Q1) in F507 (F508), and if it is found, by first foreign object detection, that the possibility of absence of a foreign object is high, transmits a Q factor measured by second Q factor measurement in F551 to the power transmission apparatus 100 (F552). Note that as will be described later, the power reception apparatus 102 can transmit GRQ(CAP) in F508, and determine, based on the CAP received in F509, whether the power transmission apparatus 100 supports second Q factor measurement (third foreign object detection method). As shown in FIG. 5B, if the power transmission apparatus 100 supports second Q factor measurement, the power reception apparatus 102 may notify the power transmission apparatus 100 of the Q factor measured in F551. If the Q factor is correctly received, the power transmission apparatus 100 transmits an ACK to the power reception apparatus 102 (F553). Since the power transmission apparatus 100 determines, at the time of transmitting the ACK to the FOD(Q1), that no foreign object exists in the Operating Volume in the first Q factor measurement, the possibility that a foreign object exists is low even at the time of second Q factor measurement executed by the power reception apparatus 102 immediately after the first Q factor measurement. For this reason, the power transmission apparatus 100 can store, in the memory 305, the Q factor received in F552 as a reference value (second reference Q factor) for judging the presence/absence of a foreign object in third foreign object detection processing.

After that, before RP1 is transmitted in F515, the power reception apparatus 102 requests the power transmission apparatus 100 to do third foreign object detection processing (F554). Upon receiving an ACK representing that the power transmission apparatus 100 has accepted the request (F555), the power reception apparatus 102 executes second Q factor measurement (F556). The power reception apparatus 102 transmits a Q factor measured by the second Q factor measurement to the power transmission apparatus 100 (F557). The power transmission apparatus 100 compares the Q factor received in F557 with a threshold based on the second reference Q factor received in F552 and stored in the memory 305, thereby determining whether the possibility of presence of a foreign object is high. Upon determining, as the result of comparison, that the possibility of absence of a foreign object is high, the power transmission apparatus 100 transmits an ACK to the power reception apparatus 102 (F558). The power reception apparatus 102 recognizes, by the received ACK, that the possibility of absence of a foreign object is high, and transmits RP1 to the power transmission apparatus 100 to create a Calibration data Point (F515). As described above, by applying the third foreign object detection method to the WPC standard, the presence/absence of a foreign object can be confirmed immediately before creation of a Calibration data Point. The state of the power transmission apparatus 100 and the power reception apparatus 102 after the power reception apparatus 102 receives the ACK (F555) to the third foreign object detection request (F554) until it transmits the Q factor to the power transmission apparatus 100 (F557) and receives a response (F558) is called a third foreign object detection processing state. Note that the power reception apparatus 102 may shift to the third foreign object detection processing state not upon receiving the ACK in F555 but upon detecting the stop of power transmission.

Here, if the power reception apparatus 102 executes the third foreign object detection method immediately before creation of a Calibration data Point (transmission of RP1 and RP2 to the power transmission apparatus 100), it may be impossible to correctly measure the received power value to be stored in RP1 and RP2. This will be described with reference to FIG. 6A.

F515 is RP1 data transmitted by the power reception apparatus 102. Note that the RP1 data may be RP2 data. A period 601 is called Twindow and is defined as Window size in the WPC standard v1.2.3. In the period 601, the power reception apparatus 102 executes measurement of a value associated with the received power value, and notifies the power transmission apparatus 100 of the measured value stored in the RP1 (or RP2) data. A period 602 is an offset period. The period 602 is called Toffset and is defined as Window offset in the WPC standard v1.2.3. The period 602 is the period between the end of the period 601 and the top of the RP1 (or RP2) data. The power reception apparatus 102 executes the measurement of the value associated with the received power value in the period 601, waits only for the period 602, and transmits the RP1 (RP2) data. The length of the period 601 (Window size) and the length of the period 602 (Window offset) are transmitted as the information elements of a Configuration Packet from the power reception apparatus 102 to the power transmission apparatus 100. Note that the power transmission apparatus 100 measures transmitted power in the same time as the period 601, and creates a Calibration data Point based on the measured value and the received power value included in the RP1 (or RP2) data.

Note that a waveform 600 schematically shows the output of the power transmission unit 302 of the power transmission apparatus 100. The waveform 600 indicates that the power transmission apparatus 100 stops power transmission from the power transmission unit 302 at time $T_0$ and resumes power transmission at time $T_5$. Note that times $T_0$ and $T_5$ in FIGS. 6A to 6C correspond to times $T_0$ and $T_5$ in FIG. 11B.

Figure 6A:
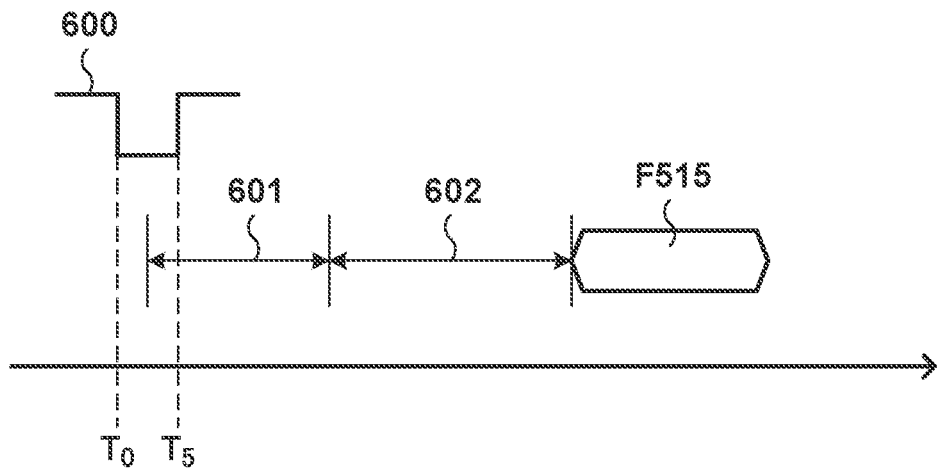
FIG. 6A is a view for explaining the relationship between a measurement period of second foreign object detection, a measurement result notification period, and a transmitted power limiting period of third foreign object detection.

Here, the period 601 may overlap the power transmission stop period ($T_0$ to $T_5$), as shown in FIG. 6A. If the power transmission stop period is short, the voltage control unit 203 of the power reception apparatus 102 can supply power enough for the operation of the power charging unit 205. Hence, the received power value is the same as in a case where the power transmission stop period is absent, that is, Pr2 in FIG. 12. On the other hand, in a case as shown in FIG. 6A, since, concerning the transmitted power value, power transmission is not performed in the power transmission stop period that is not short, the received power value can be a value smaller than Pt2. That is, if the power transmission stop period ($T_0$ to $T_5$) overlaps the period 601, the Calibration data Point is a point different from the point 1201. Hence, the foreign object detection accuracy by the power loss method degrades.

Figure 6B:
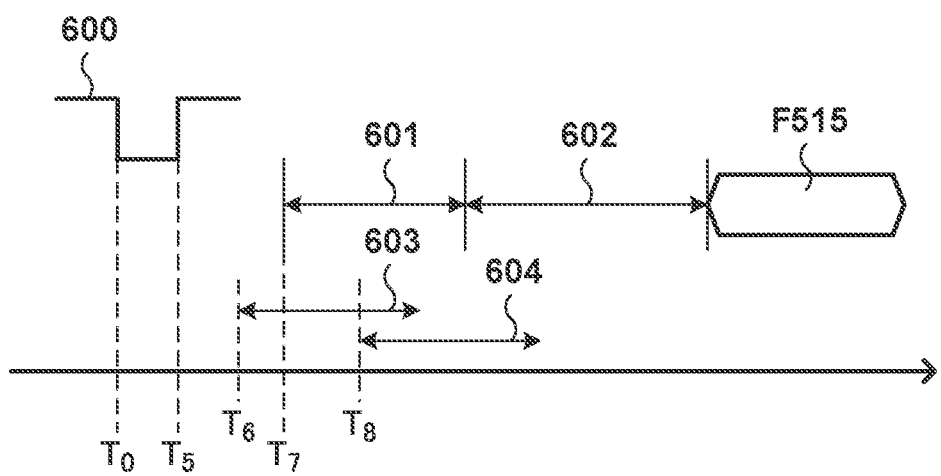
FIG. 6B is a view for explaining the relationship between a measurement period of second foreign object detection, a measurement result notification period, and a transmitted power limiting period of third foreign object detection.
Figure 6C:
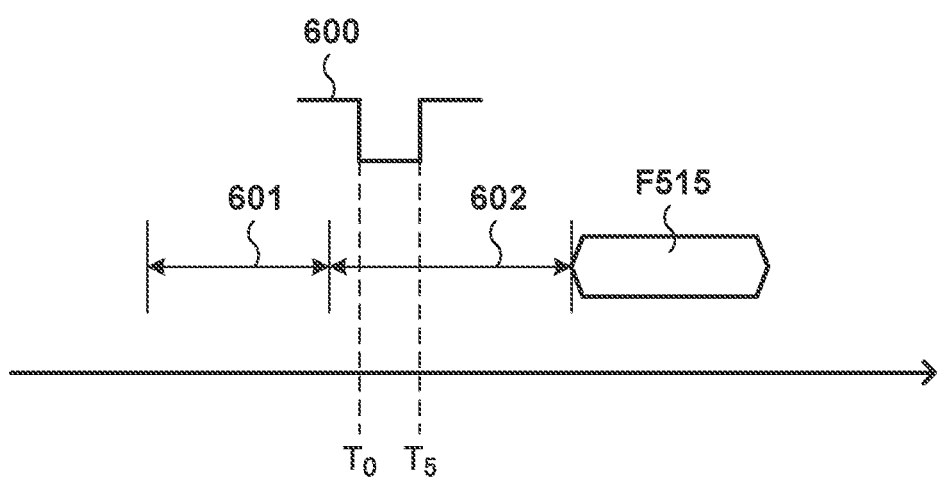
FIG. 6C is a view for explaining the relationship between a measurement period of second foreign object detection, a measurement result notification period, and a transmitted power limiting period of third foreign object detection.

On the other hand, as shown in FIG. 6B, the power reception apparatus 102 according to this embodiment transmits the RP1 or RP2 data in F515 to the power transmission apparatus 100 after at least the period 601 and the period 602 have elapsed from the resumption of power transmission of the power transmission apparatus 100 at time $T_5$. For example, the power reception apparatus 102 can start the period 601 in which received power is measured at time $T_7$ after the resumption of power transmission of the power transmission apparatus 100 at time $T_5$. If the period 601 in which received power is measured overlaps the power transmission stop period ($T_0$ to $T_5$), the power reception apparatus 102 may delay transmission of the RP1 or RP2 data to the power transmission apparatus 100 in F515. According to this, as shown in FIG. 6B, the power transmission stop period ($T_0$ to $T_5$) does not overlap the period 601. Hence, the power transmission apparatus 100 can accurately create the Calibration data Point based on the received power value received in F515.

In addition, the power transmission apparatus 100 can measure transmitted power every predetermined time such that the transmitted power can be measured in the same time as the period in which the power reception apparatus 102 measures the received power. This predetermined time is called Tslice. If the time in which the power transmission apparatus 100 measures the transmitted power overlaps the power transmission stop period ($T_0$ to $T_5$), correct foreign object detection cannot be performed using the power loss method. On the other hand, as shown in the example of FIG. 6B, Tslice is set like the difference between time $T_6$ and time $T_8$. The power transmission apparatus 100 measures the transmitted power during a period 603 of Twindow starting from time $T_6$. Similarly, the power transmission apparatus 100 also measures the transmitted power during a period 604 of Twindow starting from time $T_8$ after the elapse of time Tslice from time $T_6$. That is, the power transmission apparatus 100 measures the transmitted power during the period of Twindow while shifting the start point for starting the measurement for each Tslice. At the point of time when the top of the RP1 or RP2 data in F515 is received, the power transmission apparatus 100 selects transmitted power measured during a period corresponding to the period 601 in which the power reception apparatus 102 measures the received power. For example, as shown in FIG. 6B, if the time interval between $T_6$ and $T_7$ is smaller than Tslice/2, the power transmission apparatus 100 selects the transmitted power value measured in the period 603. If the time interval between $T_6$ and $T_7$ is larger than Tslice/2, the power transmission apparatus 100 selects the transmitted power value measured in the period 604.

After at least Tslice/2 and the periods 601 and 602 have elapsed from the resumption of power transmission of the power transmission apparatus 100 at time $T_5$, the power reception apparatus 102 transmits the RP1 or RP2 data in F515 to the power transmission apparatus 100. According to this, the time selected by the power transmission apparatus 100 transmitting the transmitted power as described above and the power transmission stop period ($T_0$ to $T_5$) do not overlap. Also, the power reception apparatus 102 may start the period 601 in which the received power is measured at time $T_7$ after at least the elapse of the time Tslice/2 after the resumption of power transmission of the power transmission apparatus 100 at time $T_5$.

Also, another configuration may be used unless the power transmission stop period ($T_0$ to $T_5$) overlaps the period 601. This will be described with reference to, for example, FIG. 6C. According to FIG. 6C, the power transmission stop period ($T_0$ to $T_5$) overlaps the period 602 but not the period 601. That is, if the power transmission stop period ($T_0$ to $T_5$) is wholly included in the period 602, the power reception apparatus 102 may perform subsequent transmission of the RP1 or RP2 data in the period 602. That is, if the power transmission stop timing (time $T_0$) is after the period 601 (after the start of the period 602), and the power transmission resumption timing (time $T_5$) is before the end of the period 602, the power reception apparatus 102 can perform subsequent transmission of the RP1 or RP2 data in the period 602.

Also, in the above-described example, the power reception apparatus 102 transmits the RP1 or RP2 data to the power transmission apparatus 100 after the elapse of at least the period of Tslice/2 and the periods 601 and 602 from the resumption of power transmission at time $T_5$. However, this is merely an example, and another configuration may be used. For example, the RP1 or RP2 data may be transmitted to the power transmission apparatus 100 after the elapse of at least a predetermined time (this predetermined time is called Tstable) and also at least the period of Tslice/2 and the periods 601 and 602 from the resumption of power transmission at time $T_5$.

(Operations of Power Transmission Apparatus and Power Reception Apparatus)

The operations of the power transmission apparatus 100 and the power reception apparatus 102 according to this embodiment will be described with reference to FIGS. 5B and 5C. Note that the same step numbers as already described above denote the same configurations, and a description thereof will be omitted. Upon receiving Signal Strength (F503), the power transmission apparatus 100 stops power transmission only for a predetermined time to cause the power reception apparatus 102 to measure the Q factor within a predetermined time from the end of the time section in which the Signal Strength (F503) is transmitted. The predetermined time here is set, at maximum, to the time from the end of the time section of preceding data (in this case the Signal Strength in F503) to the top of the time section of subsequent data (in this case, the ID in F504). For example, the predetermined time is set by, for example, the power transmission apparatus 100 such that it does not exceed the minimum value (11.5 ms) of Tstart defined by the WPC standard at maximum. Here, Tstart is a time interval defined by the WPC standard and is the time from the end of preceding data to the start of transmission of the top of subsequent data. Also, the power transmission apparatus 100 stops power transmission and resumes power transmission before the elapsed time from the end of the time section of preceding data (in this case, the Signal Strength in F503) exceeds the minimum value of Tstart described above.

Upon detecting the stop of power transmission, the power reception apparatus 102 executes second Q factor measurement between, for example, time $T_3$ and time $T_4$ in FIG. 11B (F551). Upon receiving CAP from the power transmission apparatus 100 in F510 and determining that the power transmission apparatus 100 supports second Q factor measurement (third foreign object detection method), the power reception apparatus 102 notifies the power transmission apparatus 100 of the Q factor measured in F551 (F552). If the Q factor is normally received in F552, the power transmission apparatus 100 transmits an ACK to the power reception apparatus 102 (F553). The power transmission apparatus 100 stores the Q factor received in F552 in the memory 305 as a reference value used to judge the presence/absence of a foreign object in third foreign object detection processing.

Before RP1 is transmitted in F515, the power reception apparatus 102 transmits a request of third foreign object detection processing to the power transmission apparatus 100 (F554). Upon receiving an ACK (F555), the power reception apparatus 102 transits to the above-described third foreign object detection processing state. The power reception apparatus 102 executes second Q factor measurement (F556), and transmits the measured Q factor to the power transmission apparatus 100 (F557). The power transmission apparatus 100 compares the Q factor received in F557 with a threshold based on the Q factor received in F552 and stored in the memory 305. If it is determined, as the result of comparison, that the possibility of absence of a foreign object is high, the power transmission apparatus 100 transmits an ACK to the power reception apparatus 102 (F558). Upon receiving the ACK and recognizing that the possibility of absence of a foreign object is high, the power reception apparatus 102 ends the above-described third foreign object detection processing state, and transmits RP1 to the power transmission apparatus 100 to create a Calibration data Point (F515).

Similarly, before RP2 is transmitted in F519, the power reception apparatus 102 requests the power transmission apparatus 100 to do third foreign object detection processing (F559). If an ACK is received from the power transmission apparatus 100 (F560), the power reception apparatus 102 executes second Q factor measurement (F561). The power reception apparatus 102 transmits the measured Q factor to the power transmission apparatus 100 (F562). The power transmission apparatus 100 compares the Q factor received in F562 with the threshold based on the Q factor received in F552 and stored in the memory 305. If it is determined, as the result of comparison, that the possibility of absence of a foreign object is high, the power transmission apparatus 100 transmits an ACK to the power reception apparatus 102 (F563). Upon receiving the ACK and recognizing that the possibility of absence of a foreign object is high, the power reception apparatus 102 transmits RP2 to the power transmission apparatus 100 to create a Calibration data Point (F519).

Here, assume that the power reception apparatus 102 moves, as indicated by the arrow 104 in FIG. 1, and the positional relationship with the power transmission apparatus 100 changes. In this case, it may be difficult to detect the movement by the first foreign object detection method. Hence, if the power transmission apparatus 100 supports third foreign object detection processing, the power reception apparatus 102 can request third foreign object detection at the timing of transmitting RP0. That is, after RP0 is transmitted (F522), and an ACK is received (F523), the power reception apparatus 102 transmits a third foreign object detection request to the power transmission apparatus 100 (F564). Upon receiving an ACK to the third foreign object detection request (F565), the power reception apparatus 102 transits to the above-described third foreign object detection processing state. The power reception apparatus 102 then executes second Q factor measurement (F566). The power reception apparatus 102 transmits the measured Q factor to the power transmission apparatus 100 (F567). The power transmission apparatus 100 compares the Q factor received in F567 with the threshold based on the Q factor received in F552. Upon determining that the Q factor exceeds the threshold, the power transmission apparatus 100 transmits an NAK to the power reception apparatus 102 (F568).

Note that since the power reception apparatus 102 periodically transmits RP0, the RP0 may be transmitted even in the third foreign object detection processing state. That is, the power reception apparatus 102 may transit to the third foreign object detection processing state in accordance with reception of the ACK in F565, and after that, before the third foreign object detection processing state is ended, may transmit RP0 to the power transmission apparatus 100 (F522) and receive an ACK from the power transmission apparatus 100 (F523). Upon receiving, in F523, the ACK to the RP0 transmitted in F522, the power reception apparatus 102 ends the third foreign object detection processing state. If the ACK to the RP0 is received during the operation in the third foreign object detection processing state, and an NAK to the Q factor transmitted in F567 is received in in F568, the power reception apparatus 102 determines that the possibility that the power reception apparatus 102 has moved is high. The power reception apparatus 102 can then determine that the Calibration curve already created needs to be created again. For this purpose, the power reception apparatus 102 transmits a re-Calibration request to the power transmission apparatus 100 (F569), and executes Calibration again based on the above-described processes of F554 to F520 (F571).

In the above-described embodiment, the power transmission apparatus 100 stops power transmission between the preceding data (Signal Strength in F503) and the subsequent data (ID in F504), and the power reception apparatus 102 executes second Q factor measurement during the stop of power transmission. Here, the preceding data is not limited to Signal Strength (F503), and the subsequent data is not limited to ID (F504). For example, the preceding data may be ID in F504, and the subsequent data may be Configuration in F505. In this case, the power transmission apparatus 100 can stop power transmission and resume power transmission before the elapsed time from the end of the time section of the ID in F504 exceeds the minimum value of the above-described Tstart. Alternatively, the preceding data may be ID in F504, and the subsequent data may be data storing additional identification information concerning the power reception apparatus 102. The subsequent data can be Extended ID defined by the WPC standard. The preceding data may be Extended ID, and the subsequent data may be data that notifies a delay time from the end of the time section of CE data until the power transmission apparatus 100 starts controlling the transmission voltage based on the CE data. This data can be Power Control Hold Off defined by the WPC standard.

In addition, the power reception apparatus 102 transmits the RP1 or RP2 data to the power transmission apparatus 100 in F515 after the elapse of at least the periods 601 and 602 from the resumption of power transmission by the power transmission apparatus 100 at time $T_5$, as described above. However, the present disclosure is not limited to this. For example, after the resumption of power transmission at time $T_5$, the power reception apparatus 102 first waits for the elapse of at least a time (Tstable) until the received voltage of the power reception apparatus 102, that is, the input voltage and the output voltage of the rectification unit 202 stabilize. After that, after the elapse of at least the periods 601 and 602, the power reception apparatus 102 can transmit the RP1 or RP2 to the power transmission apparatus 100 in F515.

In the above-described embodiment, the power transmission apparatus 100 stops power transmission and resumes power transmission before the elapsed time from the end of the time section corresponding to preceding data exceeds the minimum value of the above-described Tstart. This can also be performed such that the received voltage of the power reception apparatus 102, that is, the input voltage and the output voltage of the power reception coil 201 and the rectification unit 202 sufficiently stabilize before the elapsed time from the end of the time section corresponding to preceding data exceeds the minimum value of Tstart. For example, power transmission can be resumed in a time calculated by subtracting Tstable from the end of a predetermined period that is defined as a period from the timing of the end of the time section corresponding to preceding data to the timing obtained by adding the minimum value of the above-described Tstart to the end. That is, the timing at which the input voltage and the output voltage of the power reception coil 201 and the rectification unit 202 sufficiently stabilize after the start of power transmission is set before the timing at which the elapsed time from the end of the time section corresponding to preceding data exceeds the minimum value of the above-described Tstart. This allows the power reception apparatus 102 to execute more accurate second Q factor measurement.

Also, in the WPC standard, during the time defined by Tsilent from the end of the time section corresponding to data transmitted by the power reception apparatus 102, transmission of next data is not permitted. This means that the variation of the voltage value of the power transmission coil 303 or the power reception coil 201 caused by data modulation performed by the power transmission apparatus 100 or the power reception apparatus 102 stabilizes within the period of Tsilent at latest. For this reason, the power transmission apparatus 100 may stop power transmission and resume power transmission within the minimum value of the above-described Tstart after the elapse of Tsilent from the end of the time section corresponding to preceding data. That is, stop/resumption of power transmission apparatus may be inhibited before the variation of the voltage value of the power transmission coil 303 or the power reception coil 201 caused by data modulation stabilizes. This allows the power reception apparatus 102 to execute more accurate second Q factor measurement. In this case as well, the power transmission apparatus 100 can operate to resume power transmission before the time calculated by subtracting Tstable from the minimum value of the above-described Tstart elapses from the end of the time section corresponding to preceding data.

Also, the power transmission apparatus 100 may stop/resume power transmission during the time from the end of the time section corresponding to preceding data until the top of a time section in which a response to the data is transmitted. For example, the power transmission apparatus 100 can execute the stop and resumption of power transmission during the time from the end of the time section corresponding to Configuration data transmitted from the power reception apparatus 102 in F505 until the top of a time section corresponding to an ACK transmitted by the self-apparatus in F506. The WPC standard defines that before a time Tresponse elapses from the end of a time section corresponding to data transmitted by the power reception apparatus 102, the power transmission apparatus 100 starts transmitting response data to the data. Hence, the power transmission apparatus 100 can execute the stop and resumption of power transmission, for example, before the minimum value of Tresponse elapses from the end of the time section corresponding to Configuration data in F505. Also, the power transmission apparatus 100 may perform the stop/resumption of power transmission after the elapse of Tsilent from the end of the time section corresponding to preceding data up to the timing obtained by adding the minimum value of Tresponse to the end. In this case as well, the power transmission apparatus 100 can operate to resume power transmission before the time calculated by subtracting Tstable from the above-described Tresponse elapses from the end of the time section corresponding to preceding data. Note that the preceding data is not limited to the Configuration data in F505, and the subsequent data is not limited to the ACK in F506. For example, the preceding data may be the ACK in F506, and the subsequent data may be FOD(Q1) in F507.

Also, as the time ($T_0$ to $T_5$ in FIG. 11B) in which the power transmission apparatus 100 stops power transmission, a predetermined time defined by the WPC standard may be used until the second reference Q factor is stored in the memory 305. When stopping power transmission in response to the third foreign object detection request transmitted from the power reception apparatus 102, the power transmission apparatus 100 may stop power transmission based on a time requested by the power reception apparatus 102. At the point of time of transmitting the third foreign object detection request, the power reception apparatus 102 is supplying power to the loads, and the power consumption of the loads changes every time. However, if the above-described configuration is employed, the power reception apparatus 102 can change the requested time in accordance with the variation of power consumption. For example, if the power consumption is large, the requested time can be made short. If the power consumption is small, the requested time can be made long.

If the third foreign object detection request is transmitted to the power transmission apparatus 100, and an ND (Not Defined) is received as a response, the power reception apparatus 102 may judge that the power transmission apparatus 100 does not support third foreign object detection processing, and inhibit transmission of the third foreign object detection request from then on. The ND is a response that is neither an ACK (acknowledgement) nor an NAK (negative response) in the responses defined by the WPC standard and transmitted by the power transmission apparatus 100, and is data representing that the power transmission apparatus 100 does not support a request.

In FIG. 5B, a case where the RP1 or RP2 data is transmitted in F515 has been described. However, the present disclosure is not limited to this, and another data for notifying the received power value may be transmitted in F515. For example, RP0 data may be transmitted in F515.

Figure 5C:
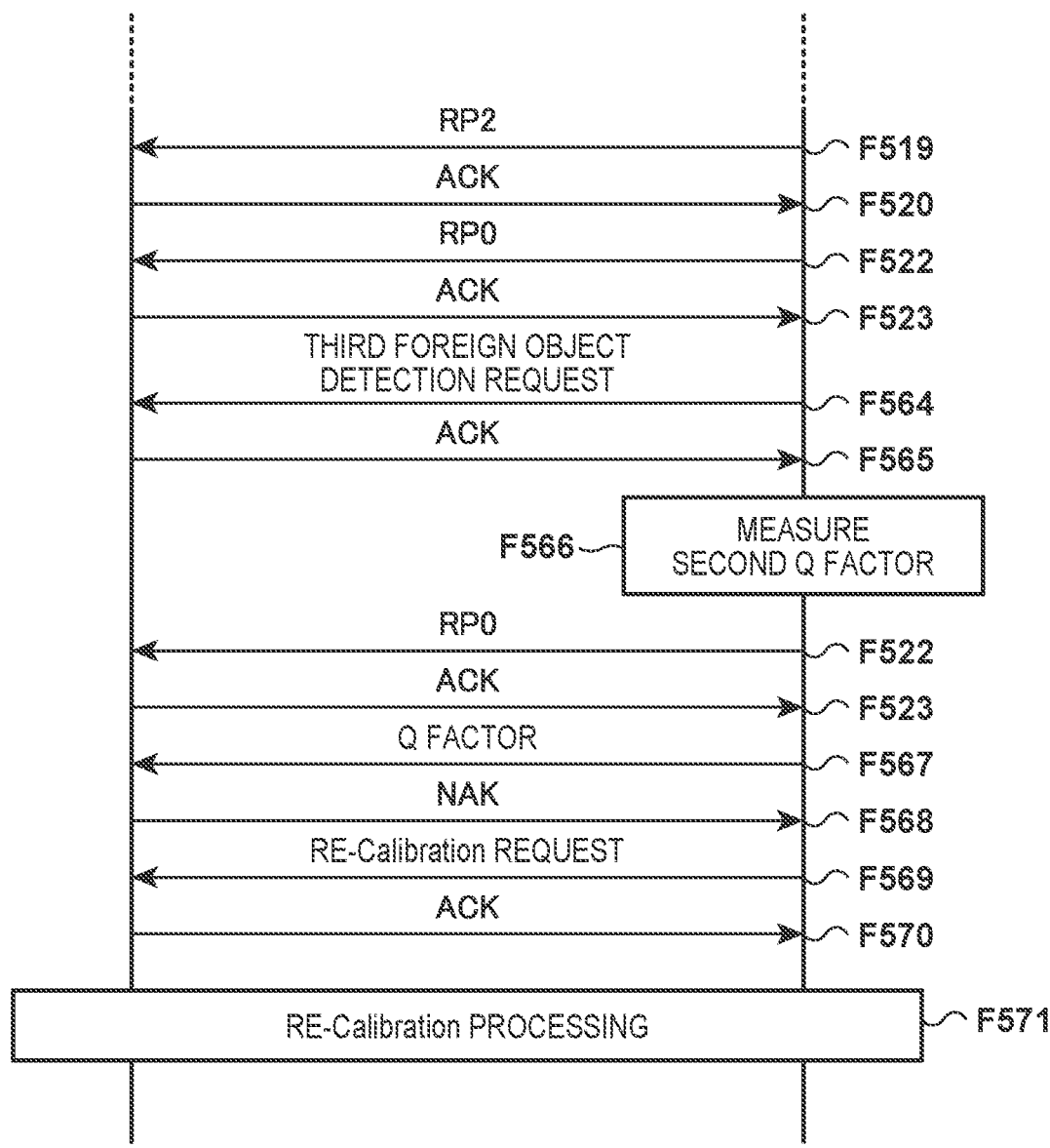
FIG. 5C is a sequence chart showing an example of the procedure of processing executed by the power transmission apparatus and the power reception apparatus according to the embodiment.
Figure 7:
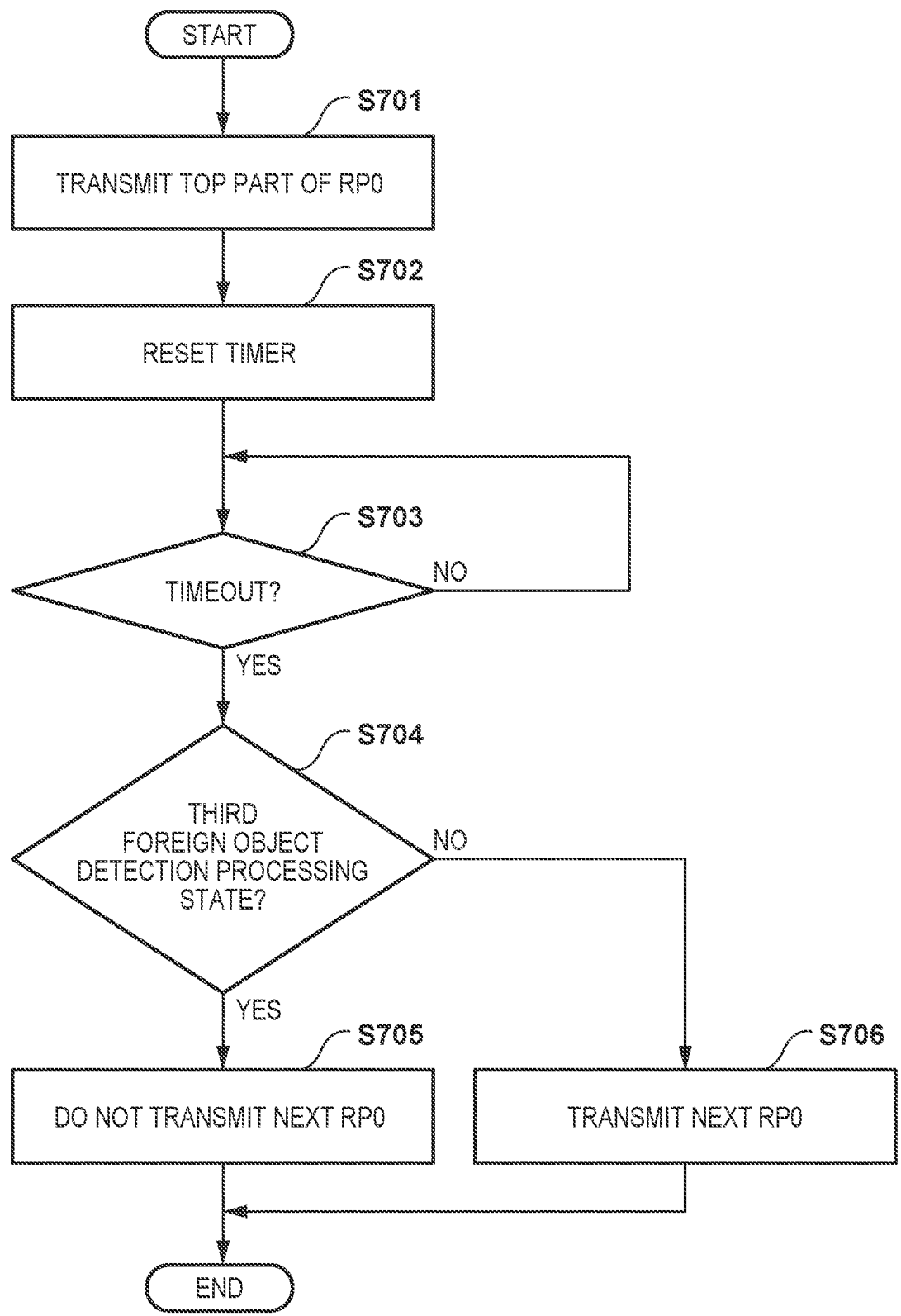
FIG. 7 is a flowchart showing an example of the procedure of processing executed by the power reception apparatus.

Note that in the above-described embodiment, if a response (ACK) to the RP0 in F522 of FIG. 5C is received in F523, the power reception apparatus 102 transmits the third foreign object detection request to the power transmission apparatus 100 in F564. According to reception of an ACK in F565, the power reception apparatus 102 transits to the third foreign object detection processing state. As described above, the power reception apparatus 102 sometimes transmits the RP0 (F522) after the transition to the third foreign object detection processing state. In this case, the power reception apparatus 102 may transmit the third foreign object detection request again even after the third foreign object detection request is transmitted in F564 immediately before. Hence, the second foreign object detection processing unit 403 of the power reception apparatus 102 can function to prevent the third foreign object detection request from being transmitted repetitively. An example of the procedure of this processing will be described with reference to FIG. 7.

The power reception apparatus 102 transmits the top part of RP0 (step S701), and resets a timer for defining the transmission interval of RP0 (step S702). Upon detecting a timeout (YES in step S703), the power reception apparatus 102 determines whether the self-apparatus is currently in the third foreign object detection processing state (step S704). If operating in the third foreign object detection processing state (YES in step S704), the power reception apparatus 102 inhibits transmission of next RP0 (step S705). This makes it possible to suppress transmission of RP0 by the power reception apparatus 102 in the third foreign object detection processing state and prevent the third foreign object detection request from being repetitively transmitted to the power transmission apparatus 100. Note that if the power reception apparatus 102 is not in the third foreign object detection processing state upon timeout (NO in step S704), the next RP0 is transmitted to the power transmission apparatus 100 (step S706). Note that according to transmission of an ACK to the third foreign object detection request, the power transmission apparatus 100 can transits to the third foreign object detection processing state. Upon receiving RP0 in the third foreign object detection processing state, the power transmission apparatus 100 may stop power transmission, output an error, and end processing associated with wireless power transfer.

The outline of an operation in a case where the power reception apparatus 102 inhibits transmission of RP0 in the third foreign object detection processing state will be described with reference to FIG. 8A. A time length 800 is a time length from the top of RP0 (F522) to transmission of next RP0, which is a time length defined as Treceived in the WPC standard. The power reception apparatus 102 transmits RP0 to the power transmission apparatus 100 at the period of the time length 800. The time length 800 can correspond to the time length of timeout in step S703. Here, in FIG. 8A, the time at which the top of next RP0 should be transmitted is defined as $T_6$. A time length 801 is a time from the end of an ACK (F523) that is a response to RP0 to the end of an ACK (F568) that is a response to a Q factor (F567). $T_7$ is the end of the ACK (F568), and represents a timing at which the power transmission apparatus 100 and the power reception apparatus 102 end the operations in the third foreign object detection processing state. The power reception apparatus 102 does not transmit RP0 during the operation in the third foreign object detection processing state. Hence, if $T_7$ is later than $T_6$ in terms of time, the power reception apparatus 102 does not transmit next RP0 at $T_6$.

On the other hand, at the timing shown in FIG. 8B, the power reception apparatus 102 operates such that the time length 801 becomes shorter than the time length 800. That is, if the time section corresponding to the time length 801 starts after the time section corresponding to the time length 800 starts, transmission of the Q factor in F567 is executed early. Accordingly, the power reception apparatus 102 operates such that the time $T_7$ to the end of the response (ACK in F568) to the Q factor (F567) comes before $T_6$ at which transmission of the top of next RP0 is started. This allows the power reception apparatus 102 to transmit RP0 for each Treceived.

Also, the time length 800 may be used as a timeout time in which transmitted power is stopped if the power transmission apparatus 100 does not receive the top of next RP0 within the time length 800 after the transmission of the top of RP0 in F522. Note that the timeout time is defined as Tpower by the WPC standard.

Figure 9A:
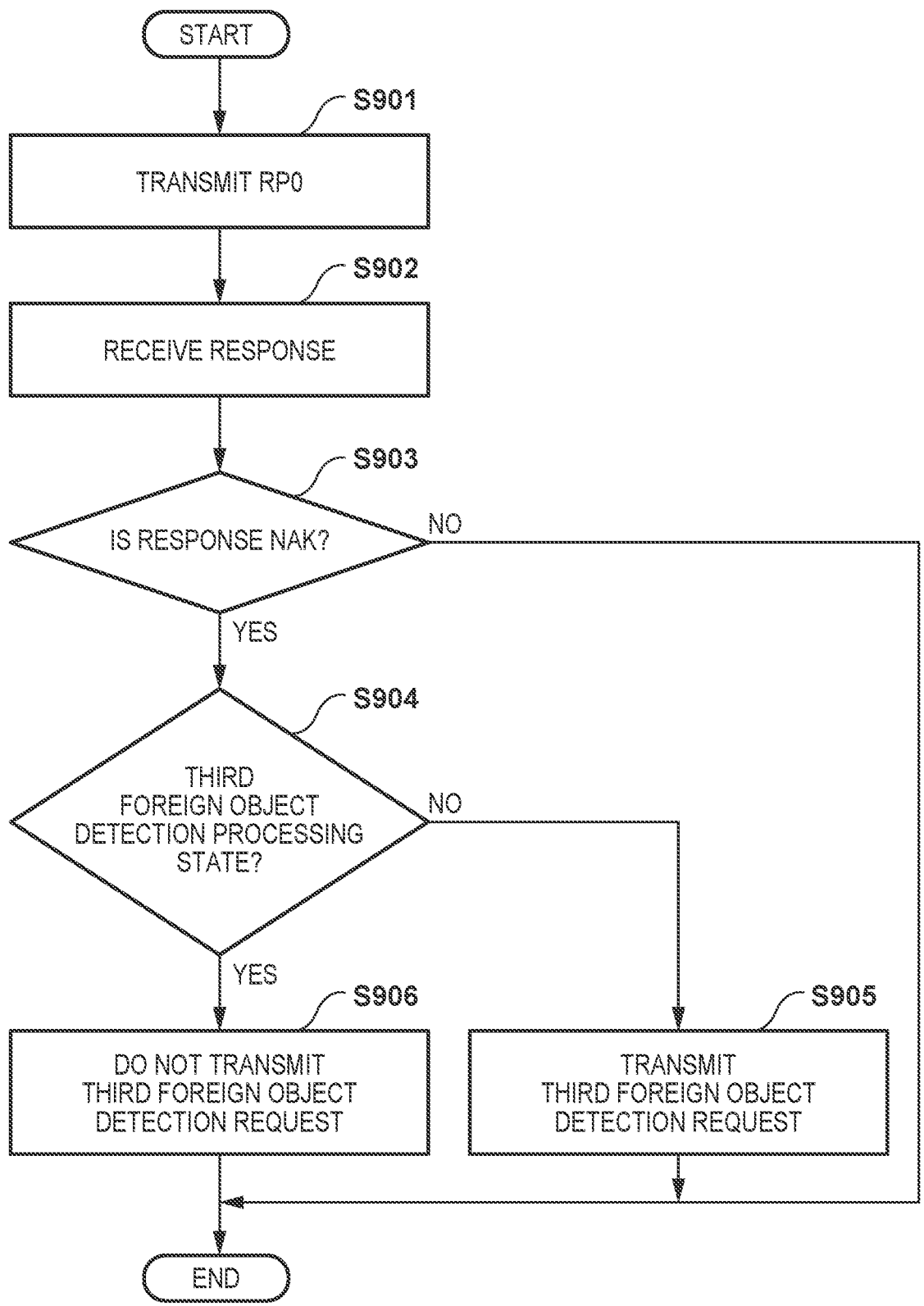
FIG. 9A is a flowchart showing an example of the procedure of processing executed by the power reception apparatus.

In the above-described example, to inhibit transmission of RP0 during the operation in the third foreign object detection processing state, the power reception apparatus 102 controls the timing of Q factor transmission and the like. On the other hand, the power reception apparatus 102 may transmit RP0 without controlling the timing of Q factor transmission and independently of whether it is operating in the third foreign object detection processing state. For example, the power reception apparatus 102 can be configured to transmit the third foreign object detection request only when RP0 is transmitted in the third foreign object detection processing state, and an NAK is obtained as the response. The procedure of processing in this case will be described with reference to FIG. 9A. The power reception apparatus 102 transmits RP0 (step S901), and receives a response (step S902). If the response is an NAK (YES in step S903), the power reception apparatus 102 determines whether it is in the third foreign object detection processing state. If operating in the third foreign object detection processing state (YES in step S904), the power reception apparatus 102 does not transmit the third foreign object detection request (step S906). On the other hand, if not operating in the third foreign object detection processing state (NO in step S904), the power reception apparatus 102 transmits the third foreign object detection request to the power transmission apparatus 100 (step S905). Also, if the response is not an NAK (NO in step S903), the power reception apparatus 102 ends the processing. According to this, the power reception apparatus 102 can continuously transmit RP0 without adjusting the timing of Q factor report or the like.

Also, the power transmission apparatus 100 may operate to change the response to RP0 depending on whether it is in the third foreign object detection processing state. The procedure of processing executed by the power transmission apparatus 100 in this case will be described with reference to FIG. 10. The power transmission apparatus 100 receives RP0 (step S1001), and determines whether the self-apparatus is operating in the third foreign object detection processing state. If operating in the third foreign object detection processing state (YES in step S1002), the power transmission apparatus 100 transmits an ND (Not Defined) to the power reception apparatus 102 (step S1003). Note that if not operating in the third foreign object detection processing state (NO in step S1002), the power transmission apparatus 100 selects an ACK/NAK based on the second foreign object detection method and transmits it to the received RP0 (step S1004).

The procedure of processing executed by the power reception apparatus 102 in this case will be described with reference to FIG. 9B. The power reception apparatus 102 transmits RP0 (step S911), receives a response (step S912), and determines whether the self-apparatus is operating in the third foreign object detection processing state (step S913). If the self-apparatus is operating in the third foreign object detection processing state (YES in step S913), and the response is an ND (YES in step S916), the power reception apparatus 102 ends the processing without performing anything. On the other hand, if the self-apparatus is operating in the third foreign object detection processing state (YES in step S913), and the response is not an ND (NO in step S916), the power reception apparatus 102 determines that the power transmission apparatus 100 is not operating based on the processing shown in FIG. 10, and the power transmission apparatus 100 is faulty or is an unauthorized apparatus. Hence, the power reception apparatus 102 transmits EPT (step S915), and ends wireless power transfer. If not operating in the third foreign object detection processing state (NO in step S913), and the response is not an ND (NO in step S914), the power reception apparatus 102 directly ends the processing. This is because in this case, the response is an ACK or NAK, and the power reception apparatus 102 can determine that the power transmission apparatus 100 is operating based on the second foreign object detection method. If the self-apparatus is not operating in the third foreign object detection processing state (NO in step S913), and the response is an ND (YES in step S914), the power reception apparatus 102 determines that the power transmission apparatus 100 is not operating based on the processing shown in FIG. 10, and the power transmission apparatus 100 is faulty or is an unauthorized apparatus. Hence, the power reception apparatus 102 transmits EPT (step S915), and ends wireless power transfer. According to this as well, the power reception apparatus 102 can continuously transmit RP0 without adjusting the timing of Q factor report or the like.

In the above-described embodiment, in second Q factor measurement, the power reception apparatus 102 measures the Q factor based on the high-frequency voltage of the power reception coil 201. Here, the high-frequency voltage can include three frequencies, that is, the power transmission frequency of the power transmission coil 303, the resonance frequency F1 of the power transmission coil 303 and the resonant capacitor 306, and the resonance frequency F2 of the power reception coil 201 and the resonant capacitor 207. For this reason, the power reception apparatus 102 may measure a Q factor at any one of the three frequencies.

Also, in the above-described embodiment, an example in which the power reception apparatus 102 measures the Q factor has been described. However, the present disclosure is not limited to this, and the power transmission apparatus 100 may measure the Q factor. Also, the power transmission apparatus 100 may measure a Q factor at one of the above-described three frequencies. When executing second Q factor measurement, the power transmission apparatus 100 may perform the stop/resumption of power transmission not only at the already described timing but also during the period after an Analog Ping is transmitted, and an object is detected in F500 until transmission of a Digital Ping is started in F502. For example, after the user places the power reception apparatus 102 in the Operating Volume, the power transmission apparatus 100 may transmit predetermined power and stop and resume power transmission within a predetermined period. The predetermined period is a period determined by, for example, Tdetect defined by the WPC standard, which represents a time after the power reception apparatus 102 is placed in the Operating Volume until transmission of the Digital Ping is started.

In addition, measurement of the second Q factor may be performed after the power transmission apparatus 100 transmits the Analog Ping and detects an object in F500 before first Q factor measurement is executed in F501. Measurement of the second Q factor may be performed during the time after first Q factor measurement is ended in F501 until transmission of the Digital Ping is started in F502. Measurement of the second Q factor may be performed after transmission of the Digital Ping is started in F502 before Signal Strength is transmitted/received in F503. For example, measurement of the second Q factor may be performed during the period equal to or shorter than Twake in the WPC standard, which represents the time after the power transmission apparatus 100 starts transmitting the Digital Ping in F502 until the power reception apparatus 102 transmits Signal Strength.

In the description about CAP in F510, upon recognizing that the power transmission apparatus 100 supports second Q factor measurement (third foreign object detection method), the power reception apparatus 102 notifies the power transmission apparatus 100 of the measurement result of the Q factor in F552. However, the present disclosure is not limited to this. Upon recognizing, by the CAP in F510, that the power transmission apparatus 100 does not support second Q factor measurement, the power reception apparatus 102 may not measure the second Q factor. Alternatively, if an ND or NAK is received after the Q factor is transmitted to the power transmission apparatus 100, the power reception apparatus 102 may not transmit the third foreign object detection request after that.

If a Q factor is correctly received, the power transmission apparatus 100 transmits an ACK to the power reception apparatus 102. If it is determined, by third foreign object detection, that the possibility of presence of a foreign object is high, the power transmission apparatus 100 may transmit an NAK to the Q factor in F552. Upon receiving the NAK, the power reception apparatus 102 may transmit EPT to cause the power transmission apparatus 100 to stop power transmission.

Also, in the above-described embodiment, the power reception apparatus 102 observes the voltage value of the power reception coil 201, thereby detecting the stop and resumption of power transmission. However, the present disclosure is not limited to this. For example, the power transmission apparatus 100 and the power reception apparatus 102 may share the timings of stop/resumption of power transmission in advance, and the power reception apparatus 102 may detect the stop and resumption using a timer and the shared timings.

Note that in place of the above-described second Q factor measurement, measurement of another physical amount that changes depending on the presence of a foreign object may be performed. For example, a change of a voltage value or a current value along with the elapse of time, or the attenuation rate of a voltage value or a current value may be measured, or a coupling coefficient between coils may be measured. Thus, foreign object detection by the above-described third foreign object detection method can be performed based on an electrical characteristic concerning at least one of the power transmission coil and the power reception coil, such as a second Q factor or another value. Note that foreign object detection need not be performed based on both the electrical characteristic of the power transmission coil and electrical characteristic of the power reception coil, and foreign object detection may be performed based on only the electrical characteristic of the power transmission coil, or only the electrical characteristic of the power reception coil.

Also, the processes shown in FIGS. 7, 9A, 9B, and 10 can be implemented by, for example, the control unit 200 of the power reception apparatus 102 or the control unit 300 of the power transmission apparatus 100 reading out and executing a program stored in advance and controlling the functional units. However, the present disclosure is not limited to this, and at least a part of the processing may be implemented by hardware. When implementing the processing by hardware, for example, a dedicated circuit can automatically be generated, using a predetermined compiler, on an FPGA from a program configured to implement the processing steps. Here, FPGA is short for Field Programmable Gate Array.

Also, like the FPGA, a Gate Array circuit may be formed to implement the hardware configured to execute at least a part of the above-described processing.

According to the present disclosure, it is possible to accurately execute detection of an object different from a power reception apparatus.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power reception apparatus comprising:
a power reception unit configured to wirelessly receive power from a power transmission apparatus;
a measurement unit configured to measure, in a first period, a value corresponding to received power used to detect a foreign object based on a relationship between a value corresponding to transmitted power in the power transmission apparatus and a value corresponding to the received power in the power reception apparatus; and
a control unit configured to control a timing of the first period such that the first period and a second period do not overlap, the second period being a period in which the power transmission apparatus limits power transmission,
wherein the control unit controls to end the first period before the power transmission is limited, and
wherein the control unit controls the timing of the first period such that the power transmission is limited and resumed in an offset period from the end of the first period until information on the value corresponding to the received power measured in the first period is transmitted to the power transmission apparatus.

2. The power reception apparatus according to claim 1, further comprising a detection unit configured to detect limit and resumption of power transmission based on the measurement of the value corresponding to the received power.

3. The power reception apparatus according to claim 1, further comprising a unit configured to share a timing of the second period in advance with the power transmission apparatus.

4. The power reception apparatus according to claim 1, wherein the control unit controls to start the first period after the power transmission is resumed.

5. The power reception apparatus according to claim 4, wherein the control unit controls, after the resumption of the power transmission, to start the first period after a time until the value corresponding to the received power in the power reception apparatus stabilizes elapses.

6. A method executed by a power reception apparatus configured to wirelessly receive power from a power transmission apparatus, comprising:

measuring, in a first period, a value corresponding to received power used to detect a foreign object based on a relationship between a value corresponding to transmitted power in the power transmission apparatus and a value corresponding to the received power in the power reception apparatus; and controlling a timing of the first period such that the first period and a second period do not overlap, the second period being a period in which the power transmission apparatus limits power transmission, wherein the first period is controlled to end before the power transmission is limited, and wherein the timing of the first period is controlled such that the power transmission is limited and resumed in an offset period from the end of the first period until information on the value corresponding to the received power measured in the first period is transmitted to the power transmission apparatus.

7. A non-transitory computer-readable storage medium that stores a program for causing a computer to perform a method including:

measuring, in a first period, a value corresponding to received power used to detect a foreign object based on a relationship between a value corresponding to transmitted power in the power transmission apparatus and a value corresponding to the received power in the power reception apparatus; and controlling a timing of the first period such that the first period and a second period do not overlap, the second period being a period in which the power transmission apparatus limits power transmission, wherein the first period is controlled to end before the power transmission is limited, and wherein the timing of the first period is controlled such that the power transmission is limited and resumed in an offset period from the end of the first period until information on the value corresponding to the received power measured in the first period is transmitted to the power transmission apparatus.

* * * * *